US010748569B1

(12) United States Patent
Ogawa et al.

(10) Patent No.: US 10,748,569 B1
(45) Date of Patent: Aug. 18, 2020

(54) MAGNETIC DISK DEVICE AND METHOD FOR DEMODULATING SERVO DEMODULATION POSITION

(71) Applicants: Kabushiki Kaisha Toshiba, Minato-ku, Tokyo (JP); Toshiba Electronic Devices & Storage Corporation, Minato-ku, Tokyo (JP)

(72) Inventors: Takuya Ogawa, Machida Tokyo (JP); Fumiya Kudo, Kamakura Kanagawa (JP); Naoki Tagami, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/560,582

(22) Filed: Sep. 4, 2019

(30) Foreign Application Priority Data

Mar. 19, 2019 (JP) .................................. 2019-051324

(51) Int. Cl.
*G11B 5/09* (2006.01)
*G11B 5/596* (2006.01)
*G11B 20/10* (2006.01)

(52) U.S. Cl.
CPC ...... *G11B 5/59655* (2013.01); *G11B 5/59666* (2013.01); *G11B 20/10018* (2013.01)

(58) Field of Classification Search
None
See application file for complete search history.

(56) References Cited

U.S. PATENT DOCUMENTS

| 5,182,682 A  * |  1/1993 | Weispfenning .... G11B 5/59688 360/135 |
| 5,442,499 A  * |  8/1995 | Emori ................ G11B 5/59655 360/77.08 |
| 5,982,711 A  * | 11/1999 | Knowles .............. G11B 5/4893 360/53 |
| 6,285,521 B1 * |  9/2001 | Hussein ................ G11B 15/46 360/73.03 |
| 7,248,426 B1 * |  7/2007 | Weerasooriya .. G11B 20/10222 360/51 |
| 7,859,778 B1   | 12/2010 | Vikramaditya et al. |
| 8,116,023 B1 * |  2/2012 | Kupferman ........ G11B 5/59655 360/48 |
| 10,522,177 B1* | 12/2019 | Bellorado ............ G11B 5/5526 |
| 2005/0068652 A1* |  3/2005 | Tomimoto ............. G11B 5/012 360/48 |
| 2005/0243455 A1* | 11/2005 | Annampedu ........ G11B 7/0053 360/46 |

(Continued)

*Primary Examiner* — Peter Vincent Agustin
(74) *Attorney, Agent, or Firm* — White & Case LLP

(57) ABSTRACT

According to one embodiment, a magnetic disk device includes a disk including two first servo sectors arranged side by side in a circumferential direction and a second servo sector located between the two first servo sectors, a head that writes data to the disk and reads data from the disk, and a controller that adjusts a second timing at which the second servo sector is demodulated based on a first timing at which the first servo sector is demodulated, and corrects a first initial phase of a first demodulation signal obtained by demodulating the second servo sector at the second timing, based on a first amplitude of the first demodulation signal.

20 Claims, 13 Drawing Sheets

(56) References Cited

U.S. PATENT DOCUMENTS

| | | | |
|---|---|---|---|
| 2007/0206477 A1* | 9/2007 | Raniuk | G11B 5/584 369/97 |
| 2010/0123968 A1* | 5/2010 | Yoshida | G11B 5/59633 360/75 |
| 2011/0002211 A1 | 1/2011 | Ratnakar Aravind | |
| 2013/0201576 A1 | 8/2013 | Grundvig | |
| 2017/0186454 A1 | 6/2017 | Asakura et al. | |

* cited by examiner

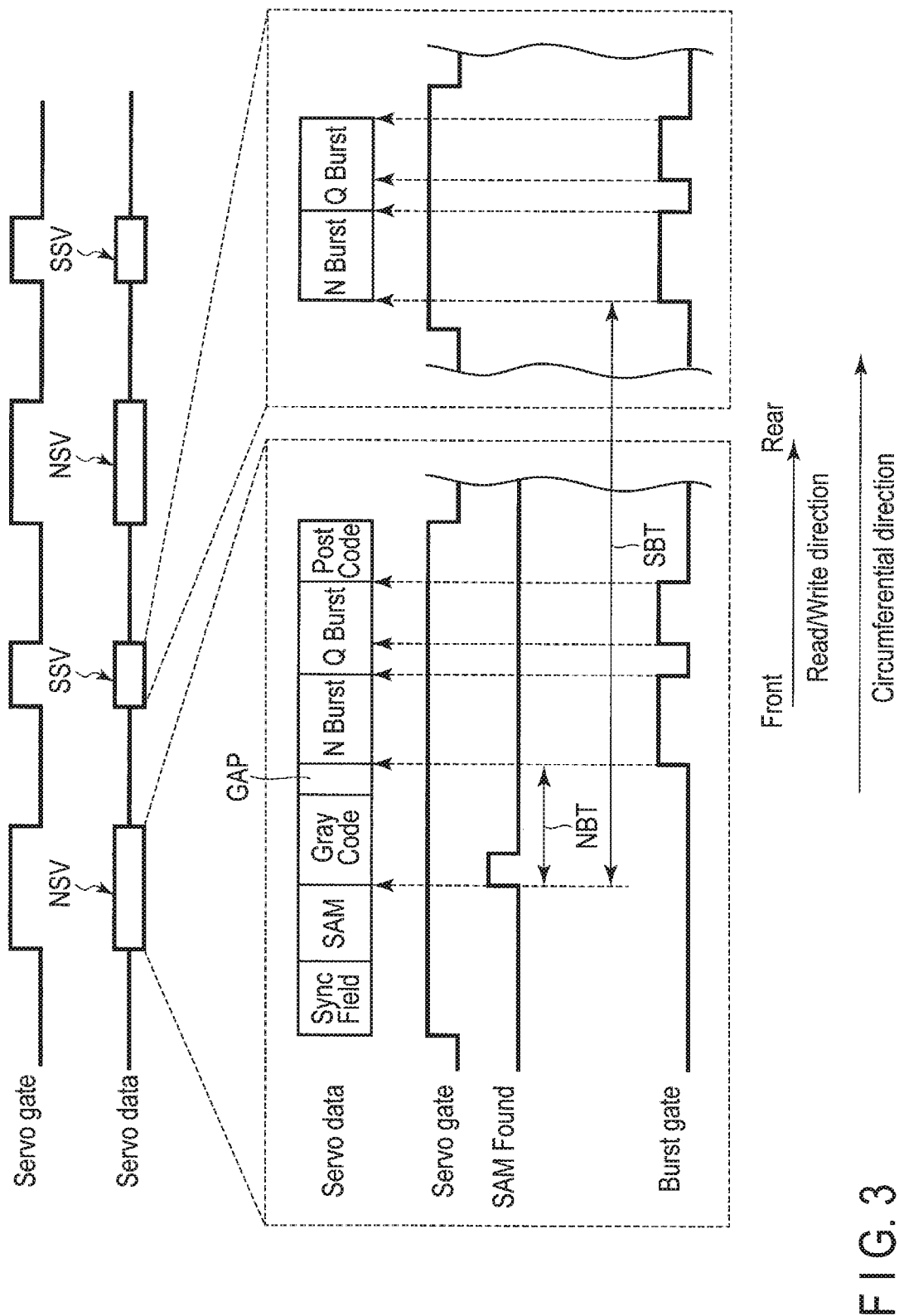
F I G. 3

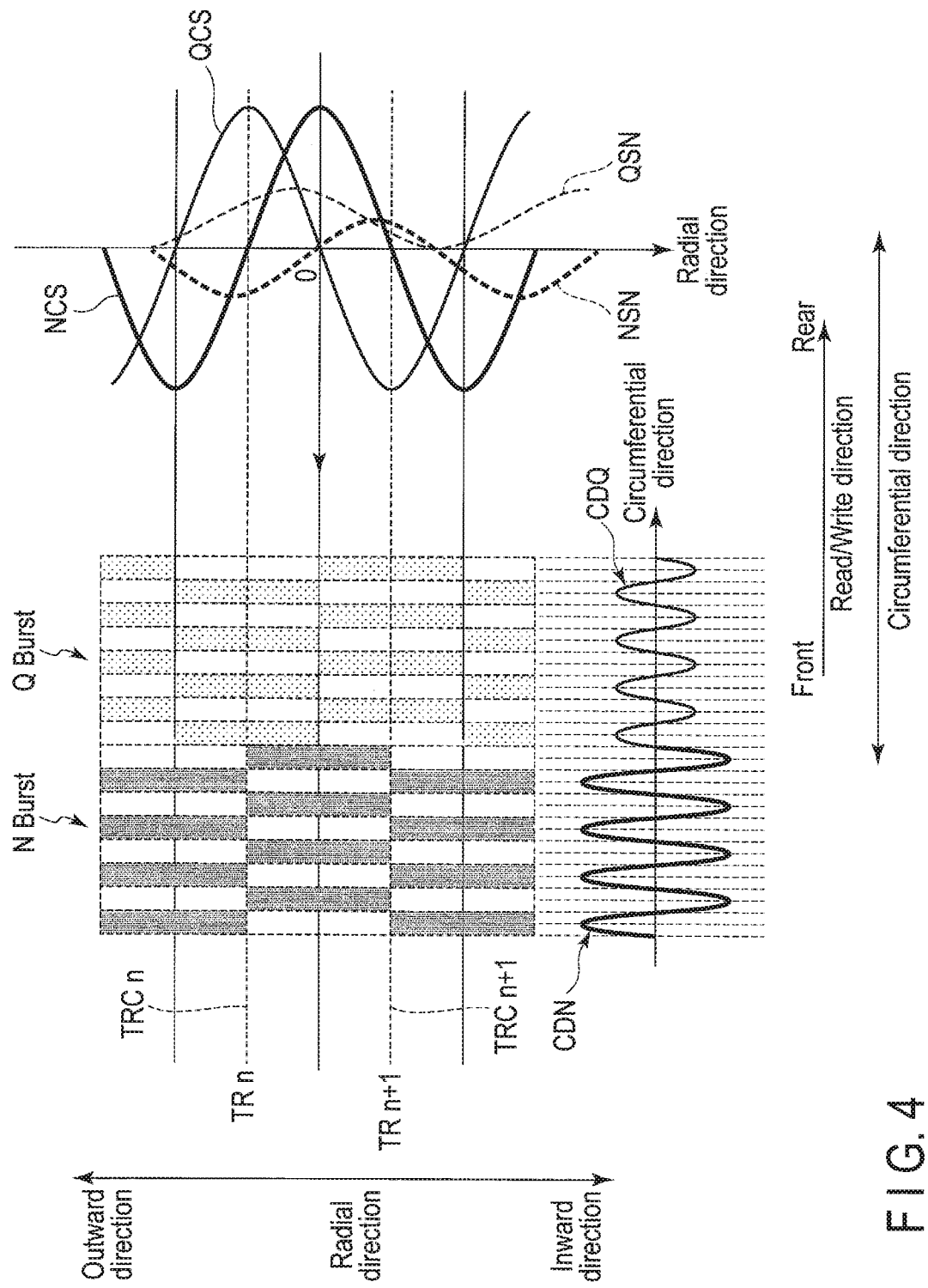
F I G. 4

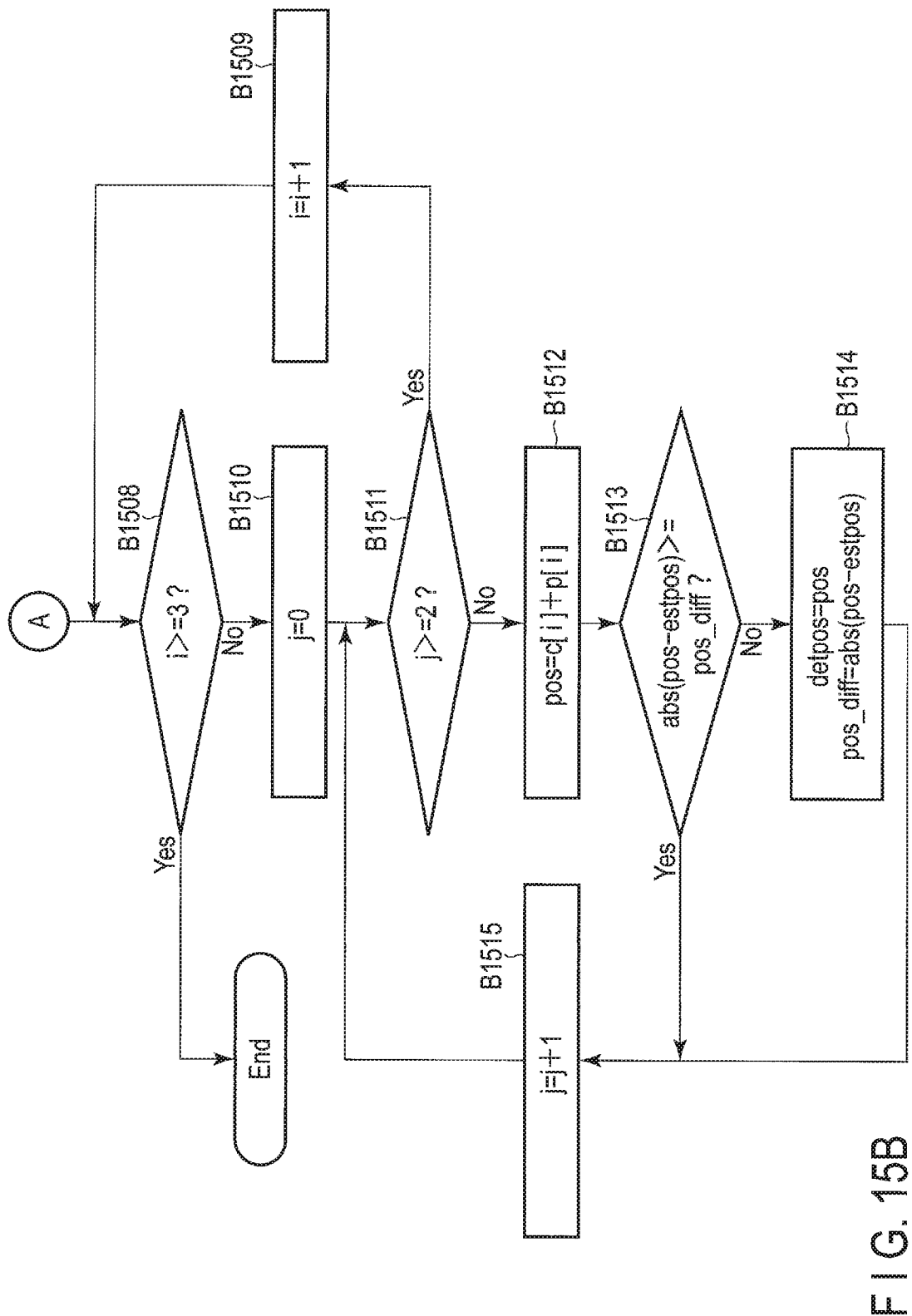
F I G. 15B

US 10,748,569 B1

MAGNETIC DISK DEVICE AND METHOD FOR DEMODULATING SERVO DEMODULATION POSITION

CROSS-REFERENCE TO RELATED APPLICATIONS

This application is based upon and claims the benefit of priority from Japanese Patent Application No. 2019-051324, filed Mar. 19, 2019, the entire contents of which are incorporated herein by reference.

FIELD

Embodiments described herein relate generally to a magnetic disk device and a method for demodulating a servo demodulation position.

BACKGROUND

A magnetic disk device having a short servo sector whose circumferential length is shorter than a circumferential length of a normal servo sector has been considered. Servo data read in the short servo sector is less than servo data read in the normal servo sector. Therefore, in the magnetic disk device, for example, the read timing cannot be synchronized by servo address mark, the read timing changes, and the quality of the demodulation process of the short servo sector may be degraded. In addition, burst data is written in a data pattern whose phase is inverted by 180° in one servo track cycle in the radial direction of the disk. Therefore, when burst data is read in a short servo sector, it may be difficult to determine whether the read timing deviates, or whether the read timing deviates in the radial direction.

BRIEF DESCRIPTION OF THE DRAWINGS

FIG. 3 is a schematic diagram illustrating an example of the configuration of normal servo and short servo according to an embodiment.

FIG. 4 is a diagram illustrating an example of data patterns of N burst and Q burst.

FIG. 15B is a flowchart illustrating an example of a method for calculating a demodulation position according to the embodiment.

DETAILED DESCRIPTION

In general, according to one embodiment, a magnetic disk device comprises: a disk comprising two first servo sectors arranged side by side in a circumferential direction and a second servo sector located between the two first servo sectors; a head that writes data to the disk and reads data from the disk; and a controller that adjusts a second timing at which the second servo sector is demodulated based on a first timing at which the first servo sector is demodulated, and corrects a first initial phase of a first demodulation signal obtained by demodulating the second servo sector at the second timing, based on a first amplitude of the first demodulation signal.

Hereinafter, embodiments will be described with reference to the drawings. Note that the drawings are merely examples and do not limit the scope of the invention.

Embodiment

Figure 1:
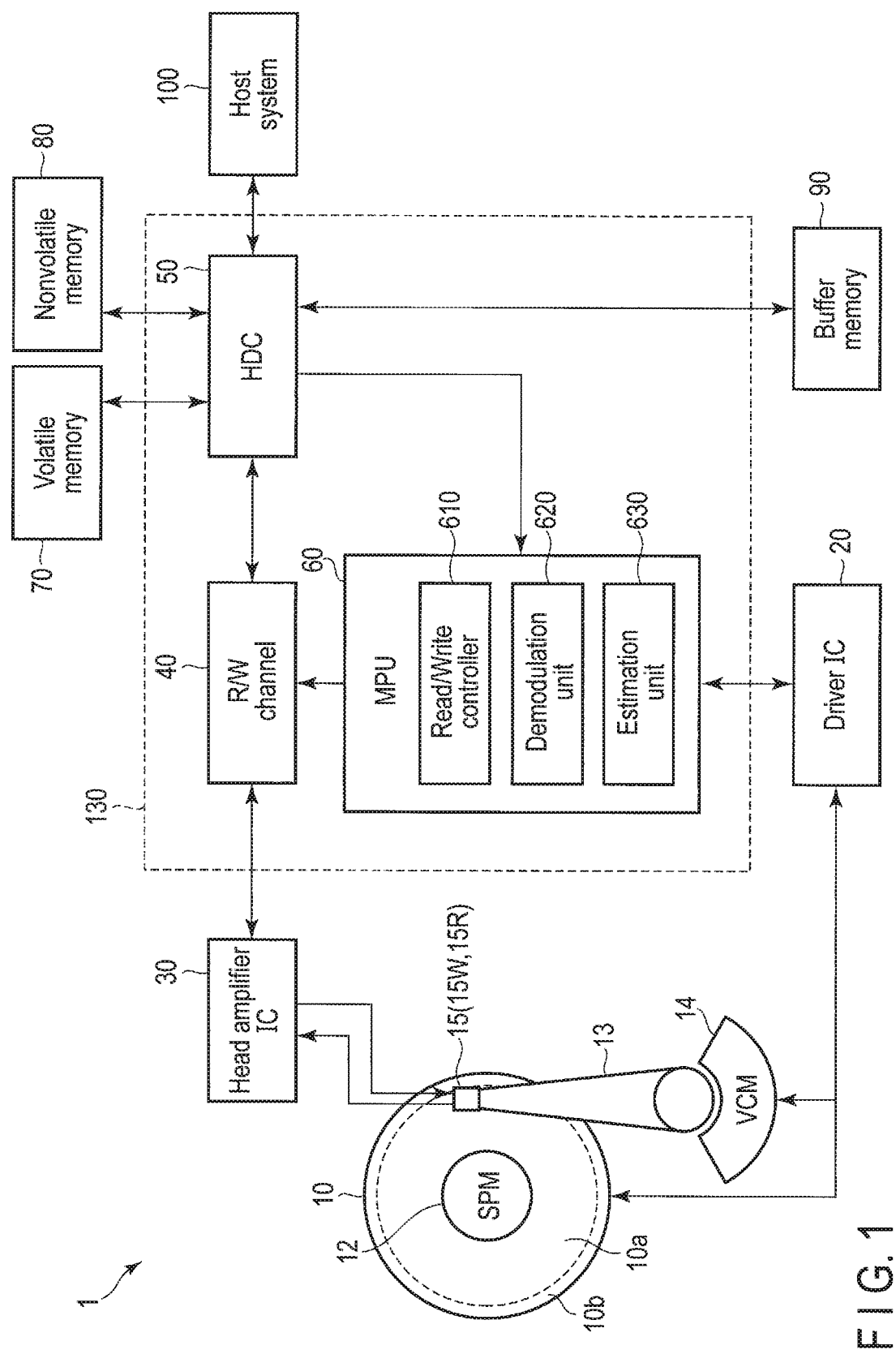
FIG. 1 is a block diagram illustrating a configuration of a magnetic disk device according to an embodiment.

FIG. 1 is a block diagram illustrating a configuration of a magnetic disk device 1 according to an embodiment.

The magnetic disk device 1 includes a head disk assembly (HDA) to be described later, a driver IC 20, a head amplifier integrated circuit (hereinafter referred to as a head amplifier IC or a preamplifier) 30, a volatile memory 70, a nonvolatile memory 80, a buffer memory (buffer) 90, and a system controller 130 that is a 1-chip integrated circuit. In addition, the magnetic disk device 1 is connected to a host system (hereinafter simply referred to as a host) 100.

The HDA includes a magnetic disk (hereinafter referred to as a disk) 10, a spindle motor (hereinafter referred to as an SPM) 12, an arm 13 on which a head 15 is mounted, and a voice coil motor (hereinafter referred to as a VCM) 14. The disk 10 is attached to the SPM 12 and is rotated by the driving of the SPM 12. The arm 13 and the VCM 14 constitute an actuator. The actuator performs movement control such that the head 15 mounted on the arm 13 is moved to a particular position of the disk 10 by driving the VCM 14. The disk 10 and the head 15 may be provided in two or more numbers.

In the disk 10, a user data region 10a available from a user and a system region 10b for writing information necessary for system management are allocated in a region to which data can be written. Hereinafter, the direction orthogonal to the radial direction of the disk 10 is referred to as a circumferential direction. In addition, a particular position of the disk 10 in the radial direction may be referred to as a radial position, and a particular position of the disk 10 in the circumferential direction may be referred to as a circumferential position. The radial position corresponds to, for example, a track, and the circumferential position corresponds to, for example, a sector. The radial position and the circumferential position may be collectively referred to simply as a position.

The head 15 includes a slider as a main body, and includes a write head 15W and a read head 15R that are mounted on the slider. The write head 15W writes data to the disk 10. The read head 15R reads data recorded in the track on the disk 10. Note that the write head 15W may be simply referred to as the head 15, the read head 15R may be referred to simply as the head 15, and the write head 15W and the read head 15R may be collectively referred to as the head 15. The central portion of the head 15 may be referred to as the head 15, the central portion of the write head 15W may be referred to as the write head 15W, and the central portion of the read head 15R may be referred to as the read head 15R. The "track" is used as one of a plurality of radially divided regions of the disk 10, data extending in the circumferential direction of the disk 10, data written to the track, and various other meanings. The "sector" is used as one of a plurality of circumferentially divided regions of the track, data written to a particular position of the disk 10, data written to a sector, or other various meanings. In addition, the radial width of the track is referred to as a track width, and the central position of the track width is referred to as a track center.

Figure 2:
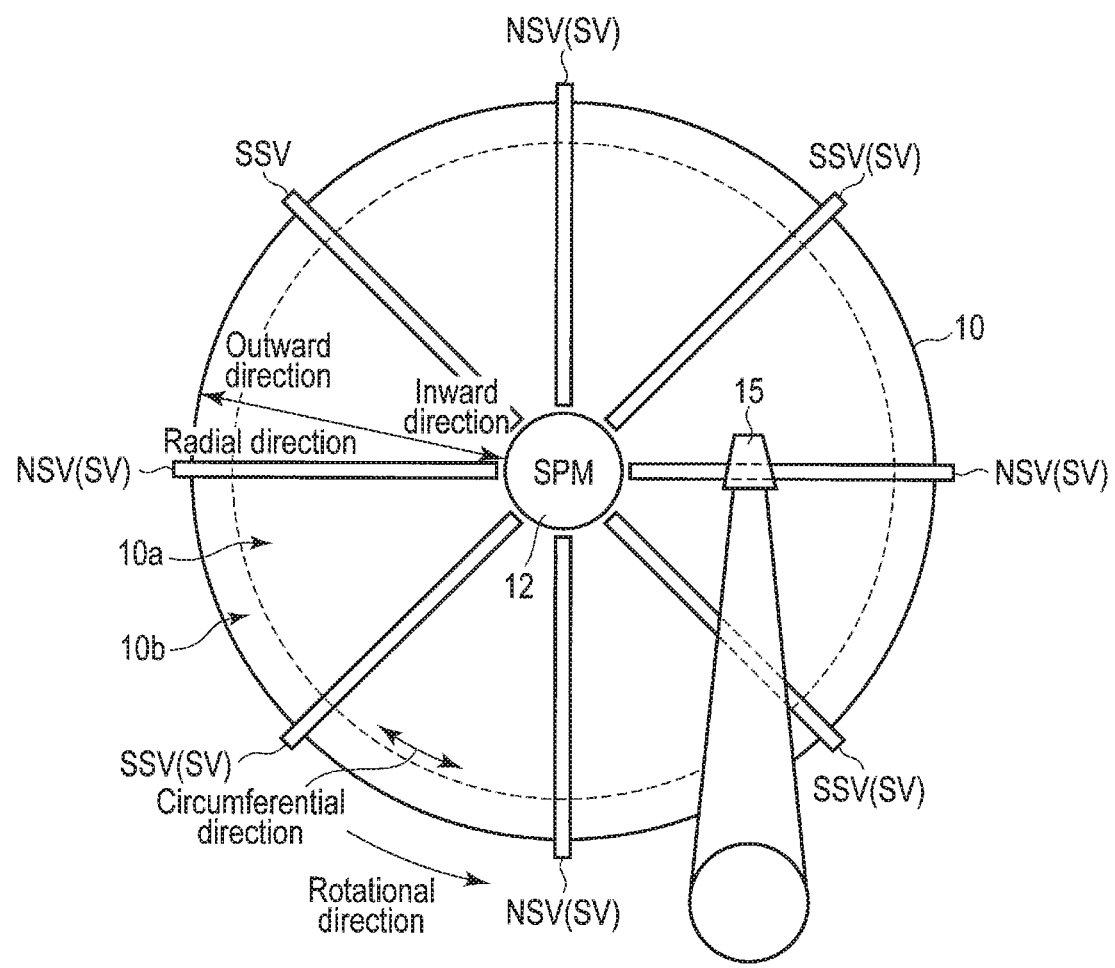
FIG. 2 is a schematic diagram illustrating an example of the arrangement of a normal servo region and a short servo region according to an embodiment.

FIG. 2 is a schematic diagram illustrating an example of the arrangement of a normal servo region and a short servo region according to an embodiment. As illustrated in FIG. 2, the direction toward the outer circumference of the disk 10 in the radial direction is referred to as an outward direction (outward), and the direction opposite to the outward direction is referred to as an inward direction (inward). In addition, FIG. 2 illustrates the rotational direction of the disk 10. Note that the rotational direction may be a reverse direction.

The disk 10 has a plurality of servo regions SV. Hereinafter, the servo region SV may be referred to as a servo sector. The plurality of servo regions SV extend radially in the radial direction of the disk 10 and are discretely arranged at particular intervals in the circumferential direction. A recording region for writing user data and the like is arranged between two servo regions SV continuous in the circumferential direction. The servo region SV has, for example, a servo region NSV (hereinafter referred to as a normal servo) and a servo region (hereinafter referred to as a short servo) SSV different from the servo region NSV. The length of the data pattern in the circumferential direction of the short servo SSV (hereinafter also simply referred to as the length) is shorter than the length of the normal servo NSV. In other words, the length of the normal servo NSV is longer than the length of the short servo SSV. In the example illustrated in FIG. 2, the normal servo NSV and the short servo SSV are alternately arranged in the circumferential direction. In other words, in the circumferential direction, one short servo SSV is arranged between two continuous normal servos NSV. Note that two or more short servos SSV may be arranged between two continuous normal servos NSV in the circumferential direction.

FIG. 3 is a schematic diagram illustrating an example of the configuration of normal servo NSV and short servo SSV according to the present embodiment. FIG. 3 illustrates the read/write direction corresponding to the direction of reading/writing in the circumferential direction. The read/write direction corresponds to, for example, a direction opposite to the rotational direction illustrated in FIG. 2. The read/write direction is a direction from the front to the rear. The front corresponds to a direction forward in time, and the rear corresponds to a direction backward in time. Hereinafter, the front side may be simply referred to as the front, and the rear side may be simply referred to as the rear. FIG. 3 illustrates the normal servo NSV and the short servo SSV alternately written to a particular track. In addition, FIG. 3 illustrates a servo gate indicating a timing for demodulating the normal servo NSV and a timing for demodulating the short servo SSV. The servo gate illustrated in FIG. 3 alternately demodulates the normal servo NSV and the short servo SSV at a particular cycle. Hereinafter, for convenience of explanation, "particular data demodulated by Fourier transform, for example, discrete Fourier transform" may be referred to as "demodulated signal". In addition, a "phase of a waveform of a demodulation signal" may be simply referred to as a "phase of a demodulation signal".

In the example illustrated in FIG. 3, the normal servo NSV includes servo data, for example, a sync field, a servo address mark (SAM), a gray code, a GAP, a N burst, a Q burst, and a post code. Hereinafter, the N burst may be simply referred to as burst, the Q burst may be simply referred to as burst, and the N burst and the Q burst may be collectively referred to as bursts. The sync field, the servo address mark, the gray code, the GAP, the N burst, the Q burst, and the post code are sequentially arranged in this order from the front to the rear in the read/write direction. The sync field includes sync field information for synchronizing with a read signal of a servo pattern including a servo address mark and a gray code. The servo address mark includes servo address mark information indicating the start of the servo pattern. The gray code includes an address of a particular track (cylinder address) and an address of a servo sector of the particular track. Each of the N burst and the Q burst is data (relative position data) used to detect radial and/or circumferential positional deviation (positional error) of the head 15 with respect to a track center of a particular track, and includes a repeating pattern having a particular cycle. The servo track (servo cylinder) corresponds to a track to be subjected to write processing or read processing according to a command from the host 100 or the like. The N burst and the Q burst are used, for example, to obtain the radial and/or circumferential position (hereinafter also referred to as a head position) of the head 15 on the disk 10. The N burst and the Q burst are, for example, Null bursts. The GAP includes GAP information of a synchronization signal such as a gap and a servo AGC. The post code includes data (hereinafter referred to as RRO correction data) or the like for correcting an error caused by track distortion with respect to the track center (target path) concentric with the disk 10 caused by a shake (repeated run out (RRO)) synchronized with the rotation of the disk 10 when servo data is written to the disk. Hereinafter, for convenience of explanation, the error caused by track distortion with respect to the track center caused by the RRO may be simply referred to as RRO. In addition, the post code may also include a post code corresponding to the short servo SSV.

FIG. 3 illustrates SAM Found indicating the timing for detecting the SAM, and a burst gate indicating the timing for demodulating the N burst and the Q burst. The timing for demodulating the N burst of the normal servo NSV in the burst gate is set based on the rising timing of the SAM Found. The timing for demodulating the N burst of the normal servo NSV in the burst gate is set to rise, for example, after a certain timing NBT from the rising timing of the SAM Found. The timing NBT is, for example, constant in each normal servo of a particular track.

In the example illustrated in FIG. 3, the short servo SSV includes servo data, for example, N burst and Q burst. The N burst and the Q burst are sequentially arranged in this order from the front to the rear in the read/write direction. The length of the N burst of the short servo SSV is equal to, for example, the length of the N burst of the normal servo NSV. Note that the length of the N burst of the short servo SSV may be different from the length of the N burst of the normal servo NSV. The length of the Q burst of the short servo SSV is equal to, for example, the length of the Q burst of the normal servo NSV. Note that the length of the Q burst of the short servo SSV may be different from the length of the Q burst of the normal servo NSV. Moreover, the test pattern of the N burst of the servo SSV may be the same as the length of the N burst of the normal servo NSV, and the data pattern of the Q burst of the servo SSV may be the same as the data pattern of the Q burst of the normal servo NSV.

The timing for demodulating the burst of the short servo SSV in the burst gate, for example, N burst, is set based on, for example, the rising timing of the normal servo NSV. The timing for demodulating the N burst of the short servo SSV in the burst gate may deviate. Therefore, the timing for demodulating the N burst of the short servo SSV in the burst gate is set to rise, for example, after the timing SBT adjusted from the rising timing of the SAM Found of the immediately previous normal servo NSV. The timing SBT is adjusted for each servo region SV, for example, for each normal servo NSV and each short servo SSV.

FIG. 4 is a diagram illustrating an example of the data pattern of the N burst and the Q burst. FIG. 4 illustrates a track TRn and a track TRn+1 adjacent in the radial direction of the track TRn, for example, in the inward direction. Hereinafter, the track adjacent in the radial direction of the particular track is referred to as an adjacent track. FIG. 4 illustrates a track center TRCn of the track TRn and a track center TRCn+1 of the track TRn+1. FIG. 4 illustrates N burst of the track TRn, Q burst of the track TRn, N burst of the track TRn+1, and Q burst of the track TRn+1. The N burst of the track TRn and the N burst of the track TRn+1 are adjacent to each other in the radial direction. The Q burst of the track TRn and the Q burst of the track TRn+1 are adjacent to each other in the radial direction. Hereinafter, other bursts adjacent in the radial direction of the particular burst may be referred to as adjacent bursts. FIG. 4 illustrates a waveform (hereinafter also referred to as a circumferential waveform) CDN of circumferential N burst obtained by demodulating the N burst of the track TRn by Fourier transform, for example, discrete Fourier transform, and a circumferential waveform CDQ of the Q burst. Hereinafter, FIG. 4 illustrates a COS component (hereinafter simply referred to as N burst COS component) NCS of a radially demodulated signal of the N burst (hereinafter also referred to as an N burst demodulation signal) calculated by demodulating the N bursts of the track TRn and the track TRn+1 by Fourier transform, for example, discrete Fourier transform, and a COS component (hereinafter simply referred to as Q burst COS component) QCS of a radially demodulated signal of the Q burst (hereinafter also referred to as a Q burst demodulation signal) calculated by demodulating the Q bursts of the track TRn and the track TRn+1 by Fourier transform, for example, discrete Fourier transform. In the N burst COS component NCS, a portion corresponding to the N burst of the track TRn is referred to as an N burst COS component NCS of the track TRn, and a portion corresponding to the N burst of the track TRn+1 is referred to as an N burst COS component NCS of the track TRn+1. In the Q burst COS component QCS, a portion corresponding to the Q burst of the track TRn is referred to as a Q burst COS component QCS of the track TRn, and a portion corresponding to the Q burst of the track TRn+1 is referred to as a Q burst COS component QCS of the track TRn+1. FIG. 4 illustrates SIN components (hereinafter simply referred to as N burst SIN components) NSN of the N burst demodulation signals of the track TRn and the track TRn+1 read in the radial direction, and SIN components (hereinafter simply referred to as Q burst SIN components) QSN of the Q burst demodulation signals of the track TRn and the track TRn+1 read in the radial direction. In the N burst SIN component NSN, a portion corresponding to the N burst of the track TRn is referred to as an N burst SIN component NSN of the track TRn, and a portion corresponding to the N burst of the track TRn+1 is referred to as an N burst SIN component NSN of the track TRn+1. In the Q burst SIN component QSN, a portion corresponding to the Q burst of the track TRn is referred to as a Q burst SIN component QSN of the track TRn, and a portion corresponding to the Q burst of the track TRn+1 is referred to as a Q burst SIN component QSN of the track TRn+1. In the following, a "radial burst demodulation signal" may be simply referred to as a "burst demodulation signal", a "radial N burst demodulation signal" may be simply referred to as an "N burst demodulation signal", and a "radial Q burst demodulation signal" may be referred to simply as a "Q burst demodulation signal".

The N burst and the Q burst periodically change in the circumferential direction of the disk 10, respectively. In the example illustrated in FIG. 4, the amplitude of the circumferential waveform CDN of the N burst is different from the amplitude of the circumferential waveform NCS of the Q burst.

The N burst and the Q burst are each written in the data pattern having two servo tracks as one cycle in the radial direction. The N burst and the Q burst are each written in the data pattern in which the phase of the burst data is inverted by 180° in one servo track cycle in the radial direction of the disk 10. In other words, the phase of a particular N burst is inverted by 180° with respect to the phase of an N burst adjacent to the particular N burst. In the example illustrated in FIG. 4, the N burst COS component of the track TRn is inverted by 180° with respect to the N burst COS component of the track TRn+1. The N burst SIN component of the track TRn is inverted by 180° with respect to the N burst SIN component of the track TRn+1. In addition, the phase of a particular Q burst is inverted by 180° with respect to the phase of a Q burst adjacent to the particular Q burst. In the example illustrated in FIG. 4, the N burst COS component of the track TRn is inverted by 180° with respect to the N burst COS component of the track TRn+1. The N burst SIN component of the track TRn is inverted by 180° with respect to the N burst SIN component of the track TRn+1. The N burst and the Q burst are written in data patterns in which the phases are deviated by 90° with each other in the radial direction of the disk 10. In other words, the phases of the N burst and the phase of the Q burst are, for example, radially deviated from each other by 90°. In the example illustrated in FIG. 4, the N burst COS component NCS and the Q burst COS component QCS are radially deviated from each other by 90°. In addition, the N burst SIN component NSN and the Q burst SIN component QSN are radially deviated from each other by 90°.

The driver IC 20 controls the driving of the SPM 12 and the VCM 14 according to the control of the system controller 130 (specifically, the MPU 60 described later).

The head amplifier IC (preamplifier) 30 includes a read amplifier and a write driver. The read amplifier amplifies a read signal read from the disk 10 and outputs the amplified read signal to the system controller 130 (specifically, the read/write (R/W) channel 40 described later). The write driver outputs, to the head 15, a write current corresponding to a signal output from the R/W channel 40.

The volatile memory 70 is a semiconductor memory in which stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory that records stored data even when power supply is cut off. The nonvolatile memory 80 is, for example, a NOR type or NAND type flash read only memory (FROM).

The buffer memory 90 is a semiconductor memory that temporarily records data and the like transmitted and received between the magnetic disk device 1 and the host 100. Note that the buffer memory 90 may be integrated with the volatile memory 70. The buffer memory 90 is, for example, a DRAM, a static random access memory (SRAM), an SDRAM, a ferroelectric random access memory (FeRAM), and a magnetoresistive random access memory (MRAM).

The system controller (controller) 130 is realized by, for example, using a large scale integrated circuit (LSI) called a system-on-a-chip (SoC) in which a plurality of elements are integrated on a single chip. The system controller 130 includes a read/write (R/W) channel 40, a hard disk controller (HDC) 50, and a microprocessor (MPU) 60. The system controller 130 is electrically connected to, for example, the driver IC 20, the head amplifier IC 30, the volatile memory 70, the nonvolatile memory 80, the buffer memory 90, the host 100, and the like.

The R/W channel 40 performs signal processing of read data transferred from the disk 10 to the host 100 and write data transferred from the host 100 in response to an instruction from the MPU 60 described later. The R/W channel 40 has a circuit or function that measures the signal quality of the read data. The R/W channel 40 is electrically connected to, for example, the head amplifier IC 30, the HDC 50, and the MPU 60 and the like.

The HDC 50 controls data transfer between the host 100 and the R/W channel 40 in response to an instruction from the MPU 60 described later. The HDC 50 is electrically connected to, for example, the R/W channel 40, the MPU 60, the volatile memory 70, the nonvolatile memory 80, the buffer memory 90, and the like.

The MPU 60 is a main controller that controls each unit of the magnetic disk device 1. The MPU 60 controls the VCM 14 through the driver IC 20 and performs servo control for positioning the head 15. In addition, the MPU 60 controls the SPM 12 through the driver IC 20 to rotate the disk 10. The MPU 60 controls the operation of writing data to the disk 10 and selects the storage destination of the write data. In addition, the MPU 60 controls the operation of reading data from the disk 10 and controls the processing of read data. The MPU 60 is connected to each unit of the magnetic disk device 1. The MPU 60 is electrically connected to, for example, the driver IC 20, the R/W channel 40, and the HDC 50 and the like.

The MPU 60 includes a Read/Write controller 610, a demodulation unit 620, and an estimation unit 630. The MPU 60 performs the processing of these units, for example, the Read/Write controller 610, the demodulation unit 620, and the estimation unit 630 on firmware. Note that the MPU 60 may include these units, for example, the Read/Write controller 610, the demodulation unit 620, and the estimation unit 630 as circuits.

The Read/Write controller 610 controls data read processing and write processing according to a command from the host 100. The Read/Write controller 610 controls the VCM 14 through the driver IC 20, positions the head 15 at a particular position of the disk 10, and reads or writes data.

The demodulation unit 620 positions the head 15 (the read head 15R) at a particular position (hereinafter referred to as a servo demodulation position) of a servo region SV of a particular track through the R/W channel 40, and performs demodulation processing on read data read at a particular timing (hereinafter referred to as a read timing). Hereinafter, the servo demodulation position in the radial direction may be referred to as a servo radial position or simply as a servo demodulation position, the servo demodulation position in the circumferential direction may be referred to as a servo circumferential position or simply a servo demodulation position, and the radial and circumferential servo demodulation positions may be collectively referred to as a servo demodulation position. Note that the demodulation unit 620 may be included in the R/W channel 40.

The demodulation unit 620 positions the head 15 (the read head 15R) at a target servo demodulation position calculated based on particular data of a normal servo NSV of a particular track, and performs demodulation processing on read data (for example, the N burst and the Q burst), which is read based on the timing when the particular data is read by the normal servo NSV, for example, the timing when the SAM is read, by Fourier transform, for example, discrete Fourier transform and the like. The demodulation unit 620 positions the head 15 (the read head 15R) at a target servo demodulation position of a short servo SSV calculated based on particular data of a normal servo NSV previously read, and performs demodulation processing on read data (for example, the N burst and the Q burst), which is read based on the timing when the particular data is read by the normal servo NSV previously read, for example, the timing when the SAM is read, by Fourier transform, for example, discrete Fourier transform and the like.

The demodulation unit 620 performs various corrections in the demodulation processing. For example, the demodulation unit 620 performs demodulation, for example, discrete Fourier transform, on the particular servo data of the servo region SV, for example, the burst, calculates a phase (hereinafter referred to as an initial phase) at which the demodulation of the demodulation signal is started, corrects the calculated initial phase, performs rotation correction on the demodulation signal whose initial phase has been corrected, performs speed correction on the demodulation signal on which the rotation correction has been performed, performs linearity correction on the demodulation signal on which the speed correction has been performed, and demodulates the servo demodulation position of the head 15, for example, the radial position, by combining a track (cylinder) address with a position (hereinafter also referred to as a burst position) calculated based on the demodulation signal on which the linearity correction has been performed. When the servo demodulation position of the head 15 is demodulated, the demodulation unit 620 demodulates the servo demodulation position of the head 15 based on the COS component or the SIN component of the burst demodulation signal. Hereinafter, it is assumed that the demodulation unit 620 demodulates the servo demodulation position of the head 15 based on the COS component of the burst demodulation signal. Note that the demodulation unit 620 demodulates the servo demodulation position of the head 15 based on the SIN component of the burst demodulation signal.

The demodulation unit 620 calculates the initial phase of the demodulation signal obtained by demodulating the particular servo data at the timing adjusted for each servo region SV, for example, each short servo SSV, for example, the initial phase of the burst demodulation signal obtained by demodulating the burst. Note that the demodulation unit 620 may calculate the initial phase of the burst demodulation signal obtained by demodulating the burst at the timing adjusted for each of the normal servo NSV and the short servo SSV. Hereinafter, the "burst demodulation signal obtained by demodulating the burst at the timing adjusted for each servo region SV" may be referred to as an "adjustment demodulation signal". In addition, an "N burst demodulation signal obtained by demodulating the N burst at the timing adjusted for each servo region SV" may be referred to as an "N adjustment demodulation signal", and a "Q burst demodulation signal obtained by demodulating the Q burst at the timing adjusted for each servo region SV" may be referred to as a "Q adjustment demodulation signal". When the initial phase is calculated so as to maximize an S/N ratio of the adjustment demodulation signal, a dead zone may occur at a location at which the amplitude of the adjustment demodulation signal is small. For example, the dead zone may occur when the initial phase at which the COS component is maximized is calculated by arctangent using the COS component and the SIN component of the adjustment demodulation signal obtained by Fourier transform. Therefore, the demodulation unit 620 corrects the initial phase of the adjustment demodulation signal based on the amplitude of the adjustment demodulation signal. Note that the demodulation unit 620 may correct the initial phase of the adjustment demodulation signal based on the amplitude of the adjustment demodulation signal obtained by demodulating the particular servo data at the timing adjusted for each short servo SSV, and may correct the initial phase of the adjustment demodulation signal based on the amplitude of the adjustment demodulation signal obtained by demodulating the particular servo data at the timing adjusted for each of the normal servo NSV and the short servo SSV. For example, the demodulation unit 620 corrects the initial phase of the adjustment demodulation signal by performing weighting and averaging based on the square ratio of the absolute value of the amplitude of the adjustment demodulation signal. Hereinafter, a "corrected adjustment demodulation signal" may be referred to as a "corrected demodulation signal", the "corrected N adjustment demodulation signal" may be referred to as an "N correction demodulation signal", and a "corrected Q adjustment demodulation signal" may be referred to as a "Q correction demodulation signal". In addition, the "initial phase of the correction demodulation signal" may be referred to as a "correction phase". The demodulation unit 620 calculates the correction phase for each servo region SV according to, for example, the following formulae (1), (2), (3), (4), (5), (6), (7), and (8).

$$\theta n = \arctan(Ns/Nc) \quad (1)$$

$$\theta q = \arctan(Qs/Qc) \quad (2)$$

$$\text{if } (\text{abs}(\text{abs}(\theta n - \theta q) \geq \pi/2) \quad (3)$$

$$\{\text{if } (Nr < 0.5)\{\text{if } ((\theta n - \theta q) \geq 0)\{\theta n = \theta n - \pi\} \text{ else } \{\theta n = \theta n + \pi\}$$

$$\text{else } \{\text{if } ((\theta n - \theta q) > 0)\{\theta q = \theta q - \pi\} \text{ else } \{\theta q = \theta q + \pi\}\}\}$$

$$Nr = (Ns^2 + Nc^2)/(Ns^2 + Nc^2 + Qs^2 + Qc^2) \quad (4)$$

$$Nwt = \text{Weight Table}[Nr \times 128] \quad (5)$$

$$\theta cr = \theta n \times Nwt + \theta q \times (1 - Nwt) \quad (6)$$

$$Ncc = Nc \times \cos(\theta cr) + Ns \times \sin(\theta cr) \quad (7)$$

$$Qcc = Qc \times \cos(\theta cr) + Qs \times \sin(\theta cr) \quad (8)$$

θn is the initial phase of the N adjustment demodulation signal before correction, θq is the initial phase of the Q adjustment demodulation signal before correction, Nr is a signal ratio when the square of the absolute value of the amplitude of the N adjustment demodulation signal is taken as a numerator and the sum of the square of the absolute value of the amplitude of the N adjustment demodulation signal and the square of the absolute value of the Q adjustment demodulation signal is taken as a denominator, Weight Table is a table of weighting the initial phase of the N adjustment demodulation signal and the initial phase of the Q adjustment demodulation signal, Nwt represents the weight of the N adjustment demodulation signal, θcr is a correction phase, Nc is the amplitude of the COS component of the N adjustment demodulation signal before correction (hereinafter also referred to as the N adjustment COS component), Qc is the amplitude of the COS component of the Q adjustment demodulation signal before correction (hereinafter also referred to as the Q adjustment COS component), Ncc is the amplitude of the COS component of the N correction demodulation signal (hereinafter also referred to as the N correction COS component), Qcc is the amplitude of the COS component of the Q correction demodulation signal (hereinafter also referred to as the Q correction COS component), Ns is the amplitude of the SIN component of the N adjustment demodulation signal (hereinafter also referred to as the N adjustment SIN component), and Qs is the amplitude of the SIN component of the Q adjustment demodulation signal (hereinafter also referred to as the Q adjustment SIN component).

Weight Table corresponds to, for example, 128 resolutions. Weight Table shows, for example, a relationship between the ratio when the square of the absolute value of the amplitude of the N adjustment demodulation signal is taken as a numerator and the sum of the square of the absolute value of the amplitude of the N adjustment demodulation signal and the square of the absolute value of the Q adjustment demodulation signal is taken as a denominator, and the weights of the initial phase of the N adjustment demodulation signal and the initial phase of the Q adjustment demodulation signal. Note that Weight Table may show, for example, a relationship between the ratio when the square of the absolute value of the amplitude of the QN adjustment demodulation signal is taken as a numerator and the sum of the square of the absolute value of the amplitude of the N adjustment demodulation signal and the square of the absolute value of the Q adjustment demodulation signal is taken as a denominator, and the weights of the initial phase of the N adjustment demodulation signal and the initial phase of the Q adjustment demodulation signal. Weight Table is optimized, for example, for each device, each head, and each radial position. As described above, the S/N ratio of the adjustment demodulation signal can be improved, without causing any dead zone, by correcting the initial phase of the adjustment demodulation signal by weighting and averaging based on the square ratio of the absolute value of the adjustment demodulation signal.

Figure 5:
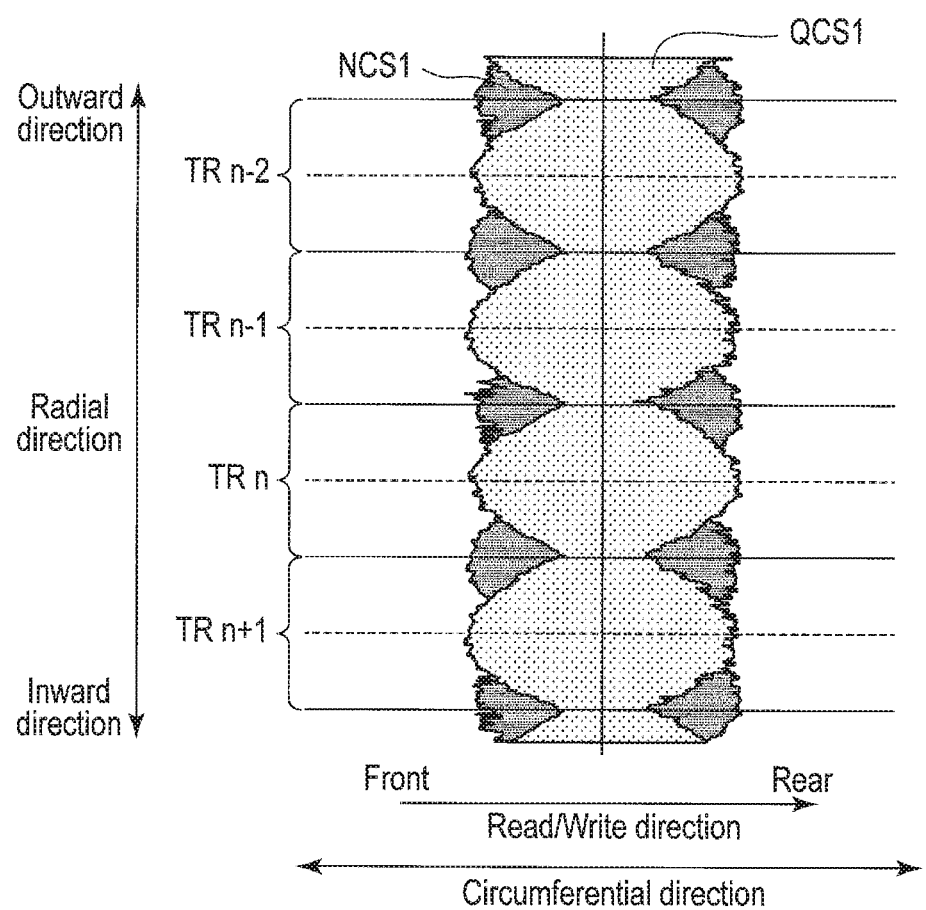
FIG. 5 is a diagram illustrating an example of an N burst COS component and a Q burst COS component of a burst demodulation signal in which burst is demodulated at a constant timing from a rising timing of SAM Found for each servo region.

FIG. 5 is a diagram illustrating an example of the N burst COS component NCS1 and the Q burst COS component QCS1 of the burst demodulation signal in which the burst is demodulated at the constant timing from the rising timing of the SAM Found for each servo region SV. FIG. 5 illustrates tracks TRn+1, TRn, TRn−1, and TRn−2 continuously arranged in the radial direction. FIG. 5 illustrates N burst COS components NCS1 of the tracks TRn+1 to TRn−2 and Q burst COS components QCS1 of the tracks TRn+1 to TRn−2. The N burst COS component NCS1 corresponds to the COS component of the N burst demodulation signal obtained by demodulating the N burst at the constant timing from the rising timing of the SAM Found immediately before each servo region SV, and the Q burst COS component QCS1 corresponds to the Q burst COS component of each servo region SV corresponding to the N burst demodulated at the constant timing from the rising timing of the SAM Found immediately before each servo region SV. For example, the N burst COS component NSC1 is calculated by demodulating the N burst at the constant timing from the rising timing of the SAM Found for each normal servo NSV, and demodulating the N burst at the constant timing from the rising timing of the SAM Found of the immediately previous normal servo NSV for each short servo SSV. For example, the Q burst COS component QCS1 is calculated by demodulating the Q burst based on N burst demodulated at the constant timing from the rising timing of the SAM Found for each normal servo NSV, and demodulating the Q burst based on the N burst demodulated at the constant timing from the rising timing of the SAM Found of the immediately previous normal servo NSV for each short servo SSV. Hereinafter, the "burst demodulation signal having a burst demodulated at the constant timing for each servo region SV" may be referred to as a "constant demodulation signal". In addition, the "N burst demodulation signal obtained by demodulating the N burst at the constant timing for each servo region SV" may be referred to as an "N constant demodulation signal", and the "Q burst demodulation signal obtained by demodulating the Q burst at the constant timing for each servo region SV" may be referred to as a "Q constant demodulation signal".

When the N burst is demodulated at the constant timing from the rising timing of the immediately previous SAM Found for each servo region SV, a deviation occurs in the timing for demodulating the N burst of each servo region SV. Therefore, the COS component of the N constant demodulation signal (hereinafter also referred to as N constant COS component) NCS1 and the COS component of the Q constant demodulation signal (hereinafter also referred to as Q constant COS component) QCS1 are changed as illustrated in FIG. 5.

Figure 6:
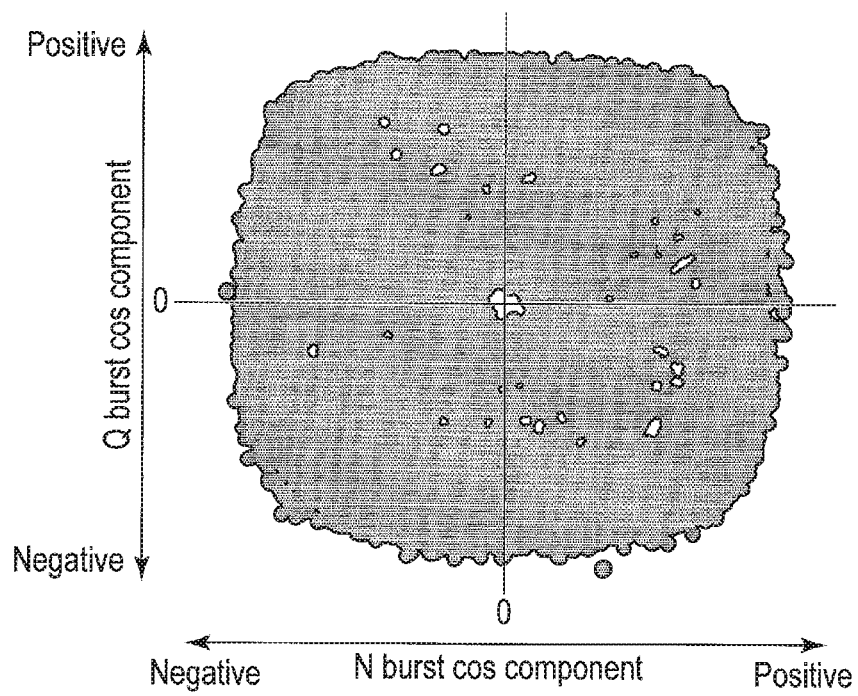
FIG. 6 is a diagram illustrating an example of a Lissajous waveform based on a N constant COS component and a Q constant COS component of two tracks illustrated in FIG. 5.

FIG. 6 is a diagram illustrating an example of a Lissajous waveform based on the N constant COS component NCS1 and the Q constant COS component QCS1 of the two tracks TRn and TRn+1 illustrated in FIG. 5. In FIG. 6, a horizontal axis represents the N burst COS component, and a vertical axis represents the Q burst COS component. In the horizontal axis of FIG. 6, the N burst COS component increases in the direction of the positive value as it proceeds in the direction of the positive arrow from the origin (=0), and the N burst COS component decreases in the direction of the negative value as it proceeds in the direction of the negative arrow from the origin (=0). In the vertical axis of FIG. 6, the Q burst COS component increases in the direction of the positive value as it proceeds in the direction of the positive arrow from the origin (=0), and the Q burst COS component decreases in the direction of the negative value as it proceeds in the direction of the negative arrow from the origin (=0).

When the N burst is demodulated at the constant timing from the rising timing of the immediately previous SAM Found for each servo region SV of the tracks TRn and TRn+1, a deviation occurs in the timing for demodulating the N burst of each servo region SV of the tracks TRn and TRn+1. Therefore, a Lissajous waveform based on the N constant COS component NCS1 of the tracks TRn and TRn+1 and the Q constant COS component QCS1 of the tracks TRn and TRn+1 is wholly distributed as illustrated in FIG. 6.

Figure 7:
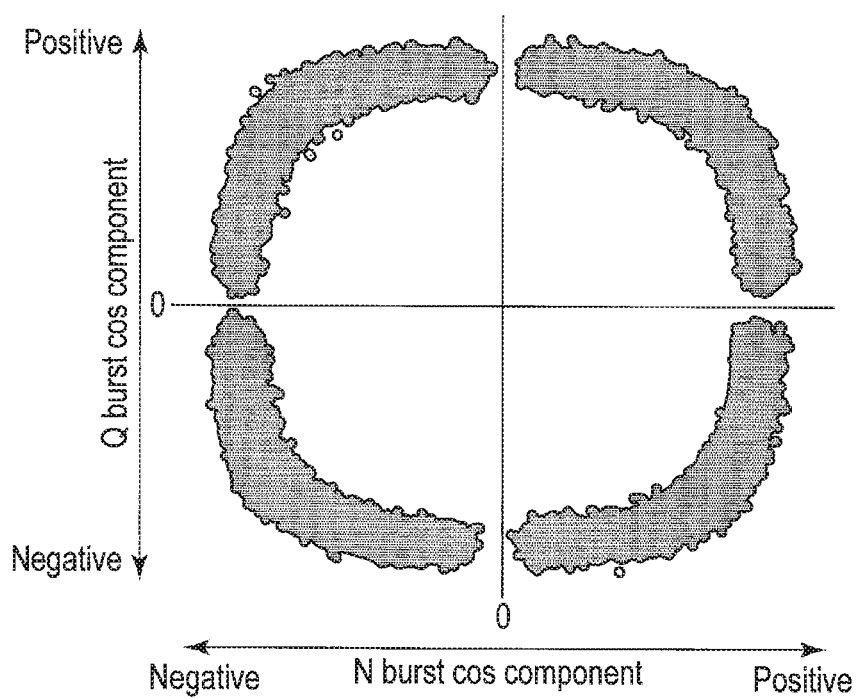
FIG. 7 is a diagram illustrating an example of a Lissajous waveform based on a N adjustment COS component and a Q adjustment COS component of two tracks.

FIG. 7 is a diagram illustrating an example of a Lissajous waveform based on the N adjustment COS component NCS1 and the Q adjustment COS component QCS1 of the two tracks TRn and TRn+1. In FIG. 7, a horizontal axis represents the N burst COS component, and a vertical axis represents the Q burst COS component. In the horizontal axis of FIG. 7, the N burst COS component increases in the direction of the positive value as it proceeds in the direction of the positive arrow from the origin (=0), and the N burst COS component decreases in the direction of the negative value as it proceeds in the direction of the negative arrow from the origin (=0). In the vertical axis of FIG. 7, the Q burst COS component increases in the direction of the positive value as it proceeds in the direction of the positive arrow from the origin (=0), and the Q burst COS component decreases in the direction of the negative value as it proceeds in the direction of the negative arrow from the origin (=0).

When the N burst is demodulated at the timing adjusted from the rising timing of the SAM Found immediately before for each servo region SV of the tracks TRn and TRn+1, the Lissajous waveform based on the N adjustment COS components of the tracks TRn and TRn+1 and the Q adjustment COS components of the tracks TRn and TRn+1 may have a substantially circular shape as illustrated in FIG. 7. In the Lissajous waveform illustrated in FIG. 7, a dead zone occurs at a phase at which the N adjustment COS components of the tracks TRn and TRn+1 and the Q adjustment COS components of the tracks TRn and TRn+1 are small.

Figure 8:
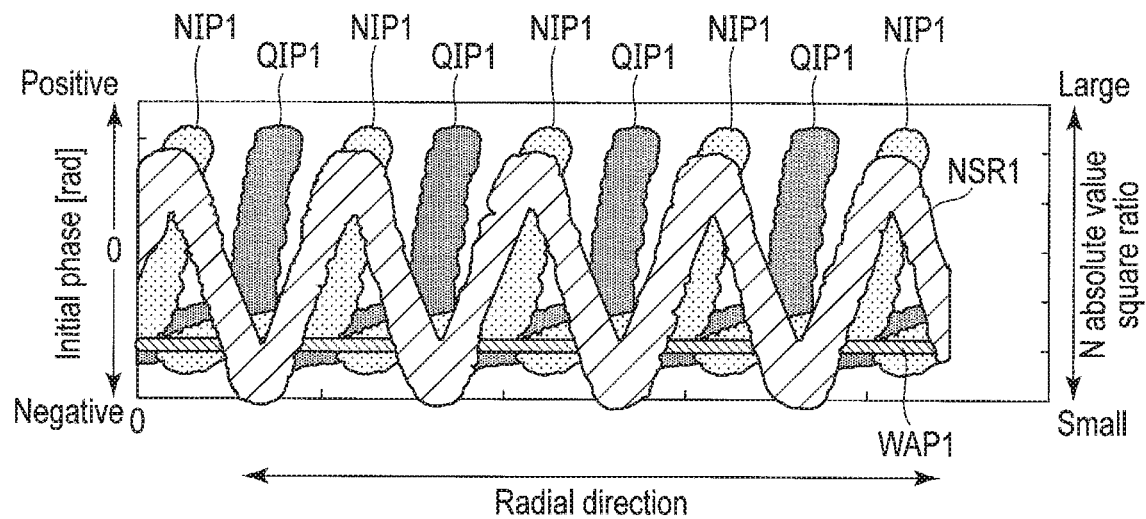
FIG. 8 is a diagram illustrating an example of a change in an initial phase of a constant demodulation signal of each servo region including only normal servo with respect to a radial position and a change in a ratio when the square of the absolute value of the N burst amplitude of the constant demodulation signal of each servo region SV including only normal servo NSV with respect to the radial position is taken as a numerator, and the sum of the square of the absolute value of N burst amplitude and the square of the absolute value of Q burst amplitude is taken as a denominator.

FIG. 8 is a diagram illustrating an example of a change in an initial phase of a constant demodulation signal of each servo region SV including only normal servo NSV with respect to a radial position and a change in a ratio when the square of the absolute value of the amplitude of the N burst demodulation signal of the constant demodulation signal of each servo region SV including only normal servo NSV with respect to the radial position is taken as a numerator, and the sum of the square of the absolute value of the amplitude of the N burst demodulation signal and the square of the absolute value of the amplitude of the Q burst demodulation signal is taken as a denominator. In FIG. 8, a horizontal axis represents the radial position, and a vertical axis represents the initial phase of the burst demodulation signal (N burst demodulation signal and Q burst demodulation signal) and the square ratio of the absolute value of the amplitude of the N burst demodulation signal. Hereinafter, the "ratio when the square of the absolute value of the amplitude of the N burst demodulation signal is taken as a numerator, and the sum of the square of the absolute value of the amplitude of the N burst demodulation signal and the square of the absolute value of the amplitude of the Q burst demodulation signal is taken as a denominator" may be referred to as an "N absolute value square ratio". In the vertical axis of FIG. 8, the initial phase of the burst demodulation signal increases in the direction of the positive value as it proceeds in the direction of the positive arrow from the origin (=0), and the initial phase of the burst demodulation signal decreases in the direction of the negative value as it proceeds in the direction of the negative arrow from the origin (=0). In the vertical axis of FIG. 8, the N absolute value square ratio increases with the direction of the large arrow and decreases with the direction of the small arrow. FIG. 8 illustrates a change NIP1 in the initial phase of the N constant demodulation signal of each servo region SV including only the normal servo NSV with respect to the radial position, a change QIP1 in the initial phase of the Q constant demodulation signal of each servo region SV including only the normal servo NSV with respect to the radial position, a change NSR1 in the N absolute value square ratio of the constant demodulation signal of each servo region SV including only the normal servo NSV with respect to the radial position, and a change WAP1 in the initial phase (hereinafter referred to as a weighted average initial phase) weighted and averaged based on the change NSR1 of the N absolute value square ratio.

In the example illustrated in FIG. 8, the change NSR1 in the N absolute value square ratio of the constant demodulation signal is calculated based on the change NIP1 in the initial phase of the N constant demodulation signal and the change QIP1 in the initial phase of the Q constant demodulation signal. The change WAP1 in the weighted average initial phase is calculated based on the change NSR1 in the N absolute value square ratio of the constant demodulation signal and the weights of the initial phase of the N burst demodulation signal and the initial phase of the Q burst demodulation signal at each radial position. The change WAP1 in the weighted average initial phase is substantially constant in each radial direction.

Figure 9:
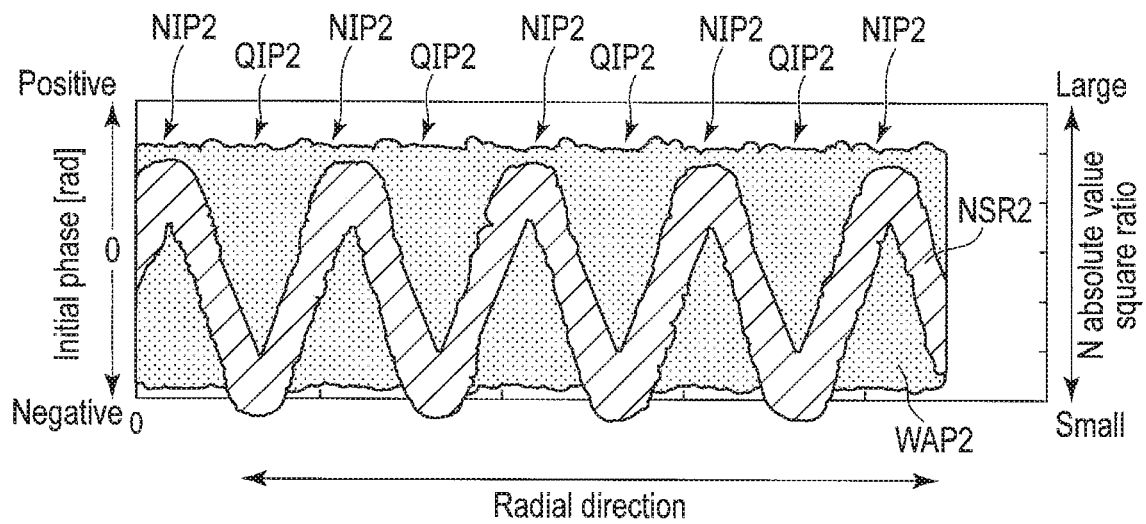
FIG. 9 is a diagram illustrating an example of a change in an initial phase of a constant demodulation signal of each servo region including normal servo and short servo with respect to the radial position and a change in a ratio when the square of the absolute value of the N burst amplitude of the constant demodulation signal of each servo region including normal servo and short servo with respect to the radial position is taken as a numerator, and the sum of the square of the absolute value of N burst amplitude and the square of the absolute value of Q burst amplitude is taken as a denominator.

FIG. 9 is a diagram illustrating an example of a change in an initial phase of a constant demodulation signal of each servo region including normal servo and short servo with respect to the radial position and a change in a ratio when the square of the absolute value of the N burst amplitude of the constant demodulation signal of each servo region including normal servo and short servo with respect to the radial position is taken as a numerator, and the sum of the square of the absolute value of N burst amplitude and the square of the absolute value of Q burst amplitude is taken as a denominator. In FIG. 9, a horizontal axis represents the radial position, and a vertical axis represents the initial phase of the burst demodulation signal (N burst demodulation signal and Q burst demodulation signal) and the N absolute value square ratio. In the vertical axis of FIG. 9, the initial phase of the burst demodulation signal increases in the direction of the positive value as it proceeds in the direction of the positive arrow from the origin (=0), and the initial phase of the burst demodulation signal decreases in the direction of the negative value as it proceeds in the direction of the negative arrow from the origin (=0). In the vertical axis of FIG. 9, the N absolute value square ratio increases with the direction of the large arrow and decreases with the direction of the small arrow. FIG. 9 illustrates a change NIP2 in the initial phase of the N constant demodulation signal of each servo region SV including the normal servo NSV and the short servo SSV with respect to the radial position, a change QIP2 in the initial phase of the Q constant demodulation signal of the constant demodulation signal of each servo region SV including the normal servo NSV and the short servo SSV with respect to the radial position, a change NSR2 in the N absolute value square ratio of the constant demodulation signal of each servo region SV including the normal servo NSV and the short servo SSV with respect to the radial position, and a change WAP2 in the weighted average initial phase weighted and averaged based on the change NSR2 in the N absolute value square ratio. In FIG. 9, the change NIP2 in the initial phase of the N constant demodulation signal and the change QIP2 in the initial phase of the Q constant demodulation signal are covered by the change WAP2 in the weight average initial phase.

In the example illustrated in FIG. 9, the change NSR2 in the N absolute value square ratio of the constant demodulation signal is calculated based on the change NIP2 in the initial phase of the N constant demodulation signal and the change QIP2 in the initial phase of the Q constant demodulation signal. The change WAP2 in the weighted average initial phase is calculated based on the change NSR2 in the N absolute value square ratio of the constant demodulation signal and the weights of the initial phase of the N burst demodulation signal and the initial phase of the Q burst demodulation signal at each radial position. The change WAP2 in the weighted average initial phase is substantially constant in each radial direction. The change NSR2 in the N absolute value square ratio is substantially the same as the change NSR1 in the N absolute value square ratio illustrated in FIG. 8. Therefore, the change WAP2 in the weight average initial phase can be corrected to the change WAP1 in the weight average initial phase illustrated in FIG. 8 by weighting and averaging the initial phase of the N burst demodulation signal and the initial phase of the Q burst demodulation signal based on the change NSR2 in the N absolute value square ratio.

Figure 10:
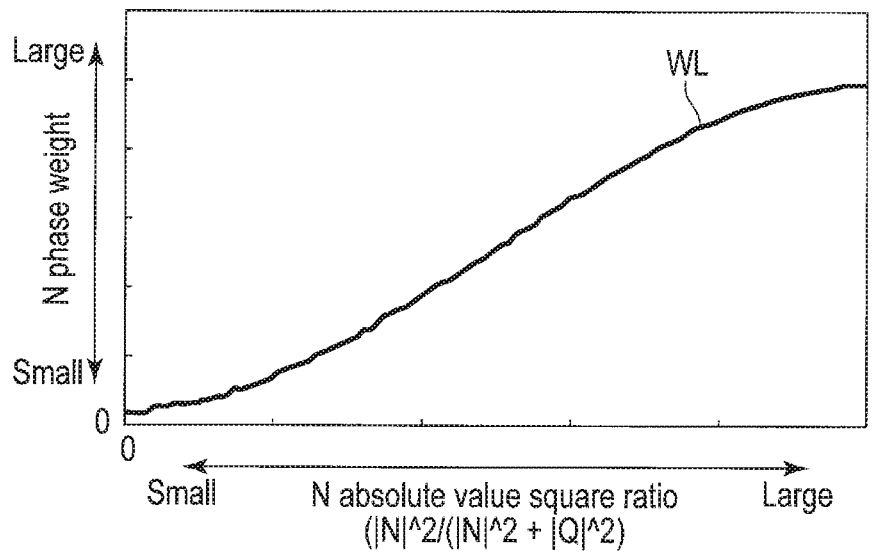
FIG. 10 is a diagram illustrating an example of a weight of an initial phase of an N burst demodulation signal with respect to an N absolute value square ratio.

FIG. 10 is a diagram illustrating an example of a weight of an initial phase of an N burst demodulation signal with respect to an N absolute value square ratio. In FIG. 10, a horizontal axis represents the N absolute value square ratio, and a vertical axis represents the weight of the initial phase of the N burst demodulation signal (hereinafter referred to as N phase weight). In the horizontal axis of FIG. 10, the N absolute value square ratio increases with the direction of the large arrow and decreases with the direction of the small arrow. In the vertical axis of FIG. 10, the N phase weight increases with the direction of the large arrow and decreases with the direction of the small arrow. FIG. 10 illustrates a change WL in the N phase weight with respect to the N absolute value square ratio.

In the example illustrated in FIG. 10, the change WL in the N phase weight increases as the N absolute value square ratio increases, and the change WL in the N phase weight decreases as the N absolute value square ratio decreases.

Figure 11:
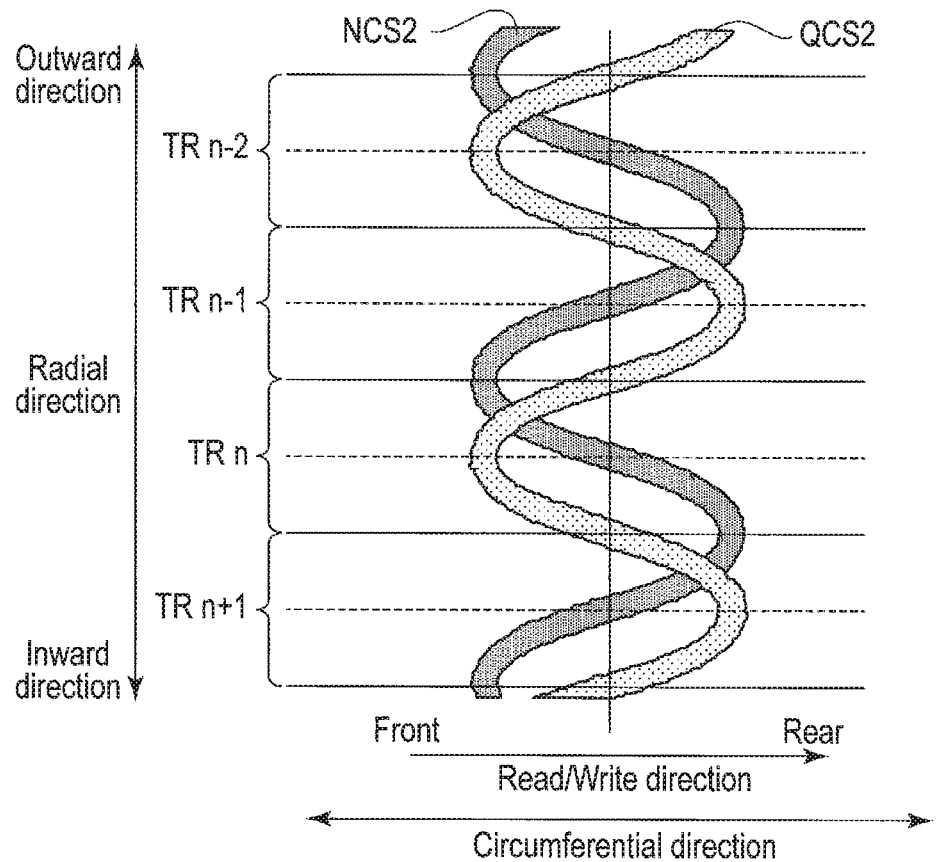
FIG. 11 is a diagram illustrating an example of an N correction COS component and a Q correction COS component.

FIG. 11 is a diagram illustrating an example of an N correction COS component NCS2 and a Q correction COS component QCS2. FIG. 11 illustrates N correction COS components NCS2 of the tracks TRn+1 to TRn−2 and Q correction COS components QCS2 of the tracks TRn+1 to TRn−2. The N correction COS component NCS2 corresponds to the N burst COS components obtained by correcting the N adjustment COS component of the N adjustment demodulation signal obtained by demodulating the N burst at the timing adjusted from the rising timing of the SAM Found immediately before each servo region SV, based on the N absolute value square ratio and the N phase weight with respect to the N absolute value square ratio, and the Q burst COS component QCS2 corresponds to the Q burst COS components obtained by correcting the Q adjustment COS component of the Q adjustment demodulation signal obtained by demodulating the Q burst at the timing adjusted from the rising timing of the SAM Found immediately before each servo region SV, based on the N absolute value square ratio and the N phase weight with respect to the N absolute value square ratio.

In the example shown in FIG. 11, the demodulation unit 620 calculates the N correction COS component NCS2 by correcting the N adjustment COS signal of the N adjustment demodulation signal obtained by demodulating the N burst at the timing adjusted from the rising timing of the SAM Found immediately before each servo region SV, based on the N absolute value square ratio illustrated in FIG. 9 and the N phase weight with respect to the N absolute value square ratio illustrated in FIG. 10. In addition, the demodulation unit 620 calculates the Q correction COS component QCS2 by correcting the Q adjustment COS component of the Q adjustment demodulation signal obtained by demodulating the Q burst based on the N burst demodulated at the timing adjusted from the rising timing of the SAM Found immediately before each servo region SV, based on the N absolute value square ratio illustrated in FIG. 9 and the N phase weight with respect to the N absolute value square ratio illustrated in FIG. 10.

Figure 12:
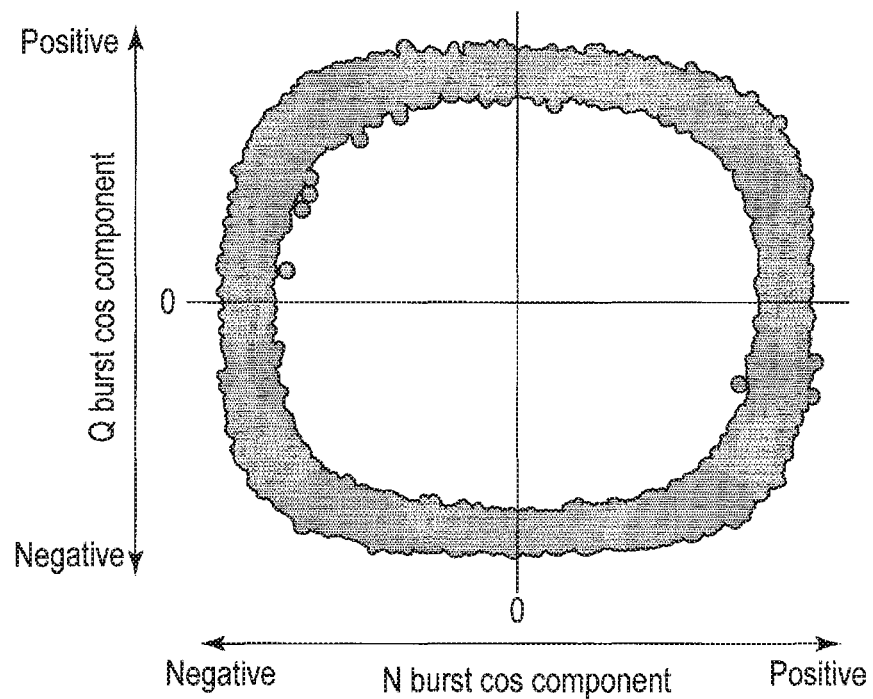
FIG. 12 is a diagram illustrating an example of a Lissajous waveform based on the N correction COS component NCS2 and the Q correction COS component of two tracks illustrated in FIG. 11.

FIG. 12 is a diagram illustrating an example of a Lissajous waveform based on the N correction COS component NCS2 and the Q correction COS component QCS2 of the two tracks TRn and TRn+1 illustrated in FIG. 11. In FIG. 12, a horizontal axis represents the N burst COS component, and a vertical axis represents the Q burst COS component. In the horizontal axis of FIG. 12, the N burst COS component increases in the direction of the positive value as it proceeds in the direction of the positive arrow from the origin (=0), and the N burst COS component decreases in the direction of the negative value as it proceeds in the direction of the negative arrow from the origin (=0). In the vertical axis of FIG. 12, the Q burst COS component increases in the direction of the positive value as it proceeds in the direction of the positive arrow from the origin (=0), and the Q burst COS component decreases in the direction of the negative value as it proceeds in the direction of the negative arrow from the origin (=0).

When the N adjustment COS component of the N adjustment demodulation signal obtained by demodulating the N burst at the timing adjusted from the rising timing of the SAM Found immediately before each servo region SV is corrected based on the N absolute value square ratio illustrated in FIG. 9 and the N phase weight with respect to the N absolute value square ratio illustrated in FIG. 10, the Lissajous waveform based on the N correction COS components of the tracks TRn and TRn+1 and the Q correction COS components of the tracks TRn and TRn+1 may have a circular shape as illustrated in FIG. 12.

The estimation unit 630 estimates the position (target servo demodulation position) of the head 15 that is a target when demodulating servo data of the short servo SSV. Hereinafter, the "estimated target servo demodulation position of the short servo SSV" is referred to as an "estimation position". For example, the estimation unit 630 may calculate the estimation position by adding the distance calculated from the speed and time of the head 15 to the position of the head 15 at which the servo data of the normal servo NSV has been demodulated, and may calculate the estimation position while correcting a model so as to be closer to a real machine by an observer.

The estimation unit 630 compares the estimation position with a plurality of servo demodulation positions that can be calculated as the servo demodulation position (hereinafter also referred to as a predicted demodulation position), and calculates a predicted demodulation position closest to the estimation unit among the plurality of predicted demodulation positions as a target servo demodulation position. For example, the estimation unit 630 calculates the track (cylinder) of the target short servo SSV based on the track (cylinder) address of the normal servo NSV immediately before the target short servo SSV, for example, the gray code. Hereinafter, the "track (cylinder) of the target short servo SSV calculated based on the track (cylinder) address of the normal servo NSV immediately before the target short servo SSV" is referred to as a "target track (cylinder)". The estimation unit 630 calculates, for example, six predicted demodulation positions by combining the radial position of the target track and two radial positions of each of two adjacent tracks adjacent to the target track in the radial direction, and the burst demodulation position (hereinafter also referred to as the correction demodulation position) calculated based on the correction demodulation signal obtained by demodulating the burst of the target short servo SSV and the correction demodulation position obtained by inverting the burst of the target short servo SSV by 180°. In other words, the estimation unit 630 calculates the predicted demodulation position obtained by combining the radial position of the target track and the burst demodulation position calculated based on the correction demodulation signal obtained by demodulating the burst of the target short servo SSV, the predicted demodulation position obtained by combining the radial position of the target track and the burst demodulation position calculated based on a correction demodulation signal obtained by inverting the burst of the target short servo SSV by 180°, the predicted demodulation position obtained by combining the radial position of the adjacent track adjacent in the outward direction of the target track and the burst demodulation position calculated based on the correction demodulation signal obtained by demodulating the burst of the target short servo SSV, the predicted demodulation position obtained by combining the radial position of the adjacent track adjacent in the outward direction of the target track and the burst demodulation position calculated based on the correction demodulation signal obtained by inverting the burst of the target short servo SSV by 180°, the predicted demodulation position obtained by combining the radial position of the adjacent track adjacent in the inward direction of the target track and the burst demodulation position calculated based on the correction demodulation signal obtained by demodulating the burst of the target short servo SSV, and the predicted demodulation position obtained by combining the radial position of the adjacent track adjacent in the inward direction of the target track and the burst demodulation position calculated based on the correction demodulation signal obtained by inverting the burst of the target short servo SSV by 180°. The estimation unit 630 compares the estimation position with the six predicted demodulation positions, selects a predicted demodulation position having the smallest difference value from the estimation position among the calculated six predicted demodulation positions, and calculates the selected predicted demodulation position as the servo demodulation position of the target short servo SSV. As described above, by comparing the plurality of predicted demodulation positions with the estimation position and setting the predicted demodulation position closest to the estimation position among the plurality of predicted demodulation positions as the servo demodulation position, it is possible to accurately calculate the servo demodulation position for demodulating the servo data of the short servo SSV, even when the servo demodulation position for demodulating the servo data of the short servo SSV deviates in the radial or circumferential direction. Note that the estimation unit 630 may be included in the demodulation unit 620.

Figure 13:
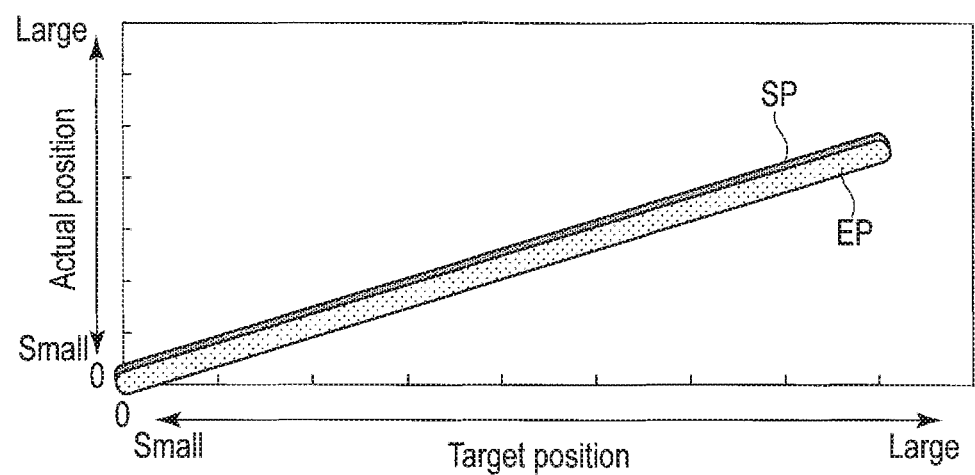
FIG. 13 is a diagram illustrating an example of a servo demodulation position of the head and an estimation position of the head in each servo region in the radial direction.

FIG. 13 is a diagram illustrating an example of the servo demodulation position SP of the head 15 and the estimation position EP of the head 15 in each servo region SV in the radial direction. In FIG. 13, a horizontal axis represents the target position of the head 15, and a vertical axis represents the actual position of the head 15. In the horizontal axis of FIG. 13, the target position increases with the direction of the large arrow and decreases with the direction of the small arrow. In the vertical axis of FIG. 13, the actual position increases with the direction of the large arrow and decreases with the direction of the small arrow. FIG. 13 illustrates the servo demodulation position SP of the head 15 in each servo region SV in the radial direction and the estimation position EP of the head 15 in each servo region SV in the radial direction. In FIG. 13, the servo demodulation position SP and the estimation position EP overlap each other.

The estimation unit 630 calculates the estimation position EP. The estimation unit 630 calculates six predicted demodulation positions by combining the radial position of the target track and the radial positions of two adjacent tracks adjacent to the target track in the radial direction, and the correction demodulation position obtained by demodulating the burst of the target short servo SSV and the correction demodulation position obtained by inverting the burst of the target short servo SSV by 180°. The estimation unit 630 compares the estimation position EP with the six predicted demodulation positions, selects the predicted demodulation position SP closest to the estimation position among the six predicted demodulation positions, and calculates the selected predicted demodulation position SP as the servo demodulation position of the target short servo SSV. As illustrated in FIG. 13, by comparing the estimation position EP with the plurality of predicted demodulation positions and setting the predicted demodulation position SP closest to the estimation position among the plurality of predicted demodulation positions as the servo demodulation position, it is possible to accurately calculate the servo demodulation position for demodulating the servo data of the short servo SSV, even when the servo demodulation position for demodulating the servo data of the short servo SSV deviates in the radial or circumferential direction.

Figure 14A:
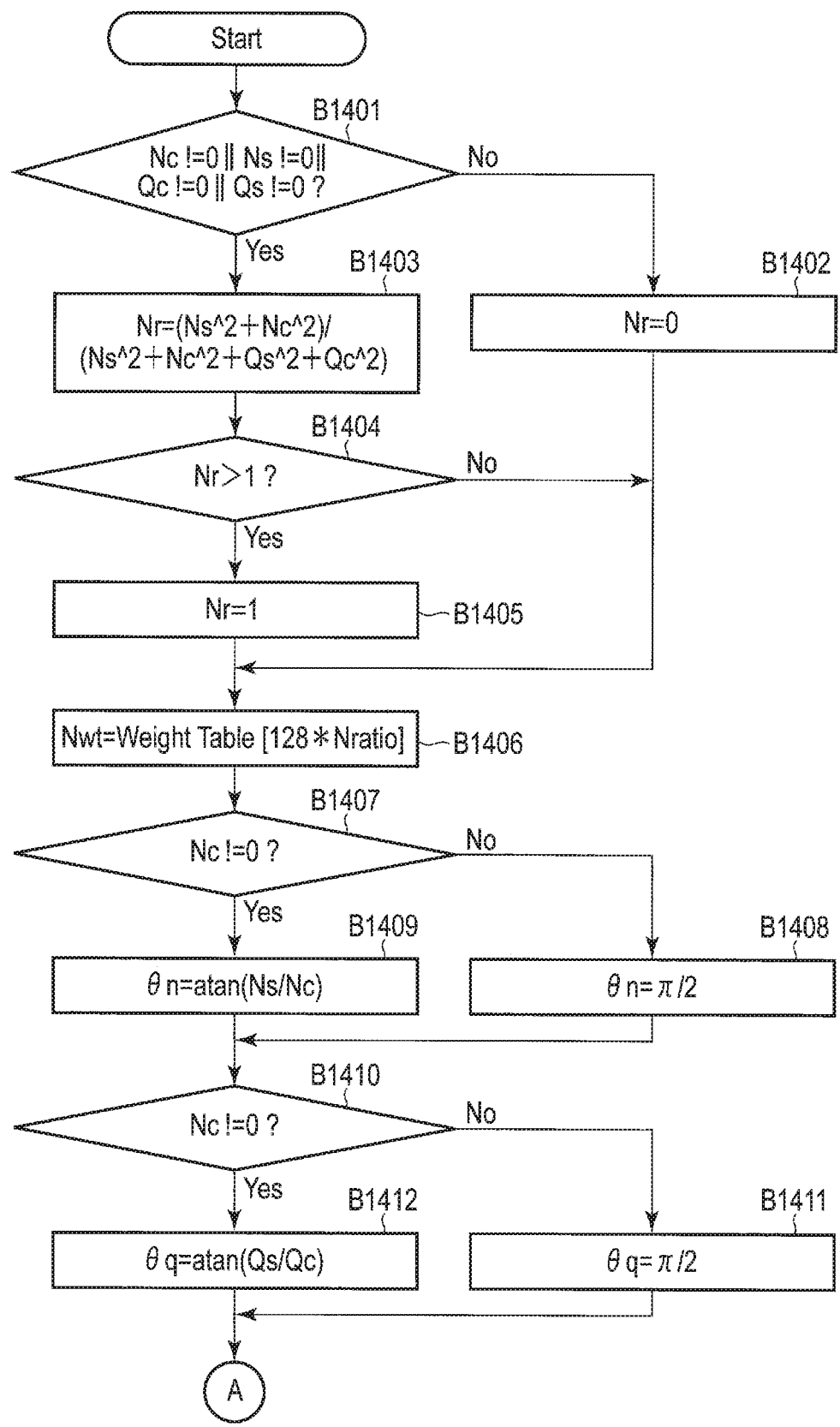
FIG. 14A is a flowchart illustrating an example of a method for correcting an initial phase according to the embodiment.
Figure 14B:
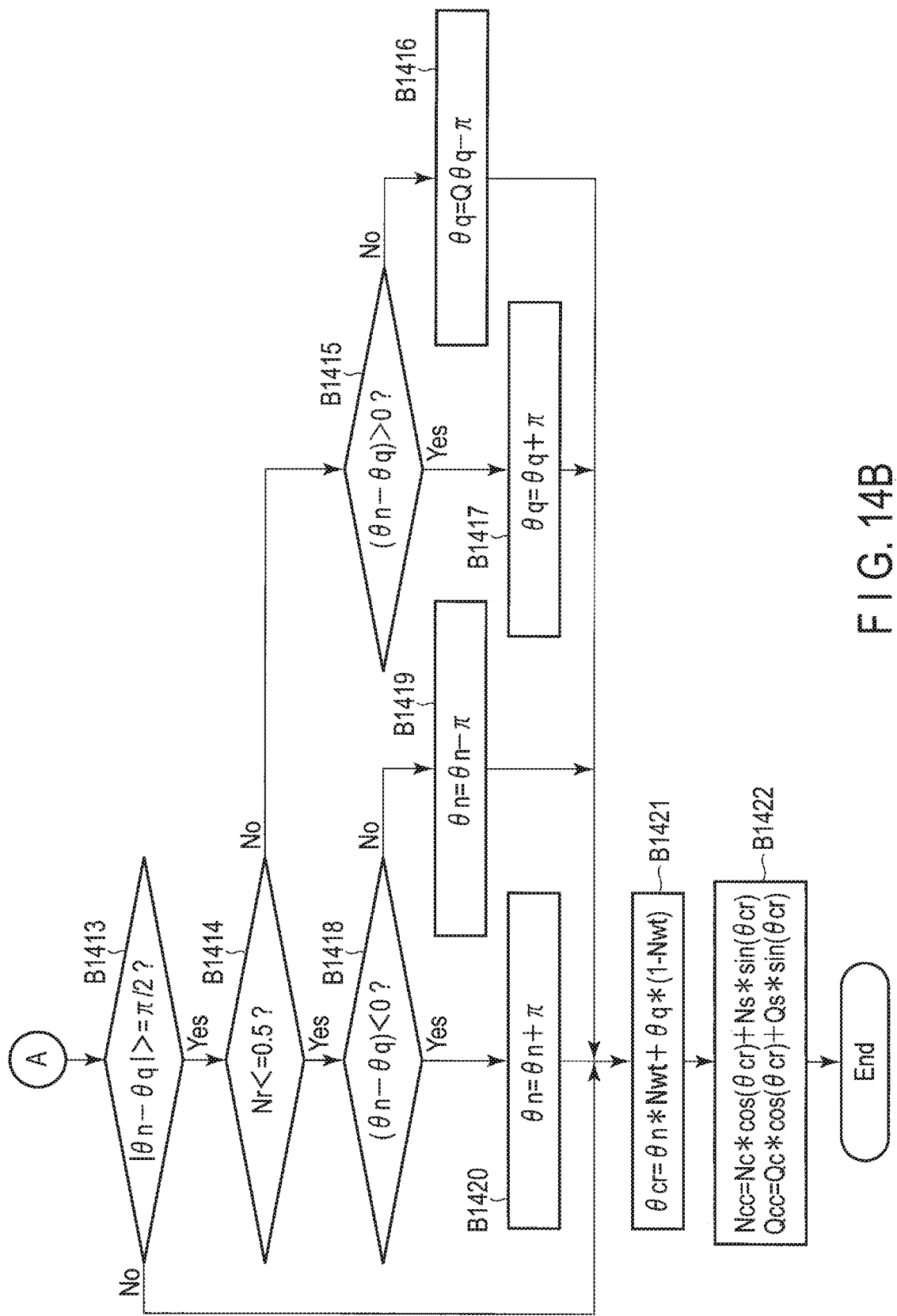
FIG. 14B is a flowchart illustrating an example of a method for correcting an initial phase according to the embodiment.

FIGS. 14A and 14B are flowchart illustrating an example of a method for correcting an initial phase according to the present embodiment.

The MPU 60 determines whether or not Nc !=0, Qc !=0, Ns !=0, and Qs !=0 (B1401). Nc is an N adjustment COS component, Qc is a Q adjustment COS component, Ns is an N adjustment SIN component, and Qs is a Q adjustment SIN component. When it is not determined that Nc !=0, Qc !=0, Ns !=0, and Qs !=0 (NO in B1401), the MPU 60 sets Nr=0 (B1402) and proceeds to the process B1406. Nr is an N absolute value square ratio. When it is determined that Nc !=0, Qc !=0, Ns !=0, and Qs !=0 (YES in B1401), the MPU 60 calculates Nr=(Ns^2+Nc^2)/(Ns^2+Nc^2+Qs^2+Qc^2) (B1403). The MPU 60 determines whether Nr>1 or Nr≤1 (B1404). When it is determined that Nr≤1 (No in B1404), the MPU 60 proceeds to the process B1406. When it is determined that Nr>1 (Yes in B1404), the MPU 60 sets Nr=1 (B1405). The MPU 60 calculates Nwt=Weight Table[128× Nr] (B1406). Nwt represents the weight of the N adjustment demodulation signal, and Weight Table is a table of weights of the initial phase of the N adjustment demodulation signal and the initial phase of the Q adjustment demodulation signal. Weight Table is, for example, 128 resolutions. The MPU 60 determines whether Nc !=0 or not (B1407). When it is not determined that Nc !=0 (No in B1407), the MPU 60 sets θn=π/2 (B1408) and proceeds to the process B1410. θn is the initial phase of the N adjustment demodulation signal before correction. When it is determined that Nc !=0 (Yes in B1407), the MPU 60 calculates θn=a tan(Ns/Nc) (B1409) and determines whether Nc !=0 or not (B1410). When it is not determined that Nc !=0 (No in B1410), the MPU 60 sets θq=π/2 and proceeds to the process A. θq is the initial phase of the Q adjustment demodulation signal before correction. When it is determined that Nc !=0 (Yes in B1410), the MPU 60 calculates θq=a tan(Qs/Qc) (B1412) and proceeds to the process A of FIG. 14A.

The MPU 60 proceeds from the process A of FIG. 14B corresponding to the process A of FIG. 14A to the process B1413 and determines whether |θn−θq|≥π/2 or |θn−θq|<π/2 (B1413). When it is determined that |θn−θq|<π/2 (No in B1413), the MPU 60 proceeds to the process B1421. When it is determined that |θn−θq|≥π/2 (Yes in B1413), the MPU 60 determines whether Nr≤0.5 or Nr>0.5 (B1414). When it is determined that Nr>0.5 (No in B1414), the MPU 60 determines whether (θn−θq)>0 or (θn−θq)≤0 (B1415). When it is determined that (θn−θq)≤0 (No in B1415), the MPU 60 sets θq=θq−π (B1416) and proceeds to the process B1421. When it is determined that (θn−θq)>0 (Yes in B1415), the MPU 60 sets θq=θq+π (B1417) and proceeds to the process B1421.

When it is determined that Nr≤0.5 (Yes in B1414), the MPU 60 determines whether (θn−θq)<0 or (θn−θq)≥0 (B1418). When it is determined that (θn−θq)≥0 (No in B1418), the MPU 60 sets θn=θn−π (B1419) and proceeds to the process B1421. When it is determined that (θn−θq)<0 (Yes in B1418), the MPU 60 sets θn=θn+π (B1420) and calculates θcr=θn×Nwt+θq×(1−Nwt) (B1421). The MPU 60 calculates Ncc=Nc×cos(θcr)+Ns×sin(θcr) and Qcc=Qc×cos(θcr)+Qs×sin(θcr) (B1422) and ends the process.

Figure 15A:
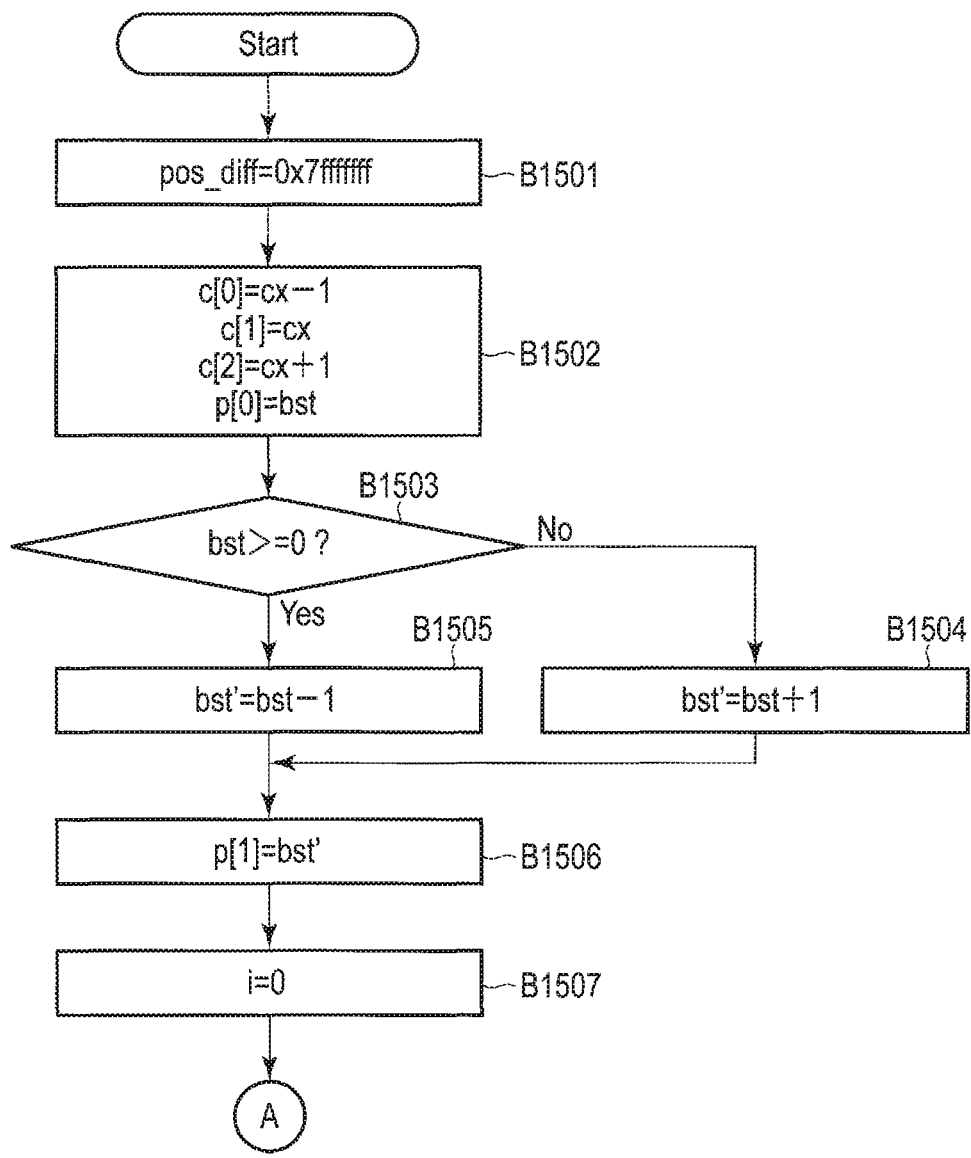
FIG. 15A is a flowchart illustrating an example of a method for calculating a demodulation position according to the embodiment.

FIGS. 15A and 15B are flowcharts illustrating an example of a method for calculating a demodulation position according to the present embodiment.

The MPU 60 sets pos_diff=0x7fffff (B1501). pos_diff is a difference between the estimation position and the actual demodulation position. The MPU 60 calculates c[0]=cx−1, cx[1]=cx, c[2]=cx+1, and p[0]=bst (B1502). c is the track (cylinder). cx is the target track (cylinder). p is the burst demodulation position, for example, the correction demodulation position, and bst is the burst demodulation position, for example, the correction demodulation position. The MPU 60 determines whether bst≥0 or bst<0 (B1503). When it is determined that bst<0 (No in B1503), the MPU 60 sets bst'=bst+1 (B1504) and proceeds to the process B1506. bst' is the burst demodulation position obtained by inverting bst by 180° with reference to ±1 Cyl, for example, the correction demodulation position. When it is determined that Bst≥0 (Yes in B1503), the MPU 60 sets bst'=bst−1 (B1505), sets p[1]=bst' (B1506) and i=0 (B1507), and proceeds to the process A of FIG. 15A. i is a cylinder number variable.

The MPU 60 proceeds from the process A of FIG. 15B corresponding to the process A of FIG. 15A to the process B1508 and determines whether i≥3 or i<3 (B1508). When it is determined that i≥3 (Yes in B1508), the MPU 60 ends the process. When it is determined that i<3 (No in B1508), the MPU 60 sets j=0 (B1510) and determines whether j≥2 or j<2 (B1511). When it is determined that j≥2 (Yes in B1511), the MPU 60 sets i=i+1 (B1509) and proceeds to the process B1508. When it is determined that j<2 (No in B1511), the MPU 60 calculates pos=c [i]+p [i] (B1512) and determines whether abs(pos−estpos)≥pos_diff or abs(pos−estpos)<pos_diff (B1513). pos is the demodulation position, and estpos is the estimation position. When it is determined that abs(pos−estpos)≥pos_diff (Yes in B1513), the MPU 60 sets j=j+1 (B1515) and proceeds to the process B1511. j is the burst demodulation position, for example, the number variable of the correction demodulation positions. When it is determined that abs(pos−estpos)<pos_diff (No in B1513), the MPU 60 calculates detpos=pos and pos_diff=abs(pos−estpos) (B1514), sets j=j+1 (B1515), and proceeds to the process B1511. detpos is the servo demodulation position.

According to the present embodiment, the magnetic disk device 1 demodulates the servo demodulation position of the head 15 based on the particular servo data of the servo region SV. When the position of the head 15 is demodulated, the magnetic disk device 1 calculates the phase of the adjustment demodulation signal obtained by demodulating the burst at the timing adjusted for each servo region SV. The magnetic disk device 1 corrects the initial phase of the adjustment demodulation signal by performing weighting and averaging based on the N absolute value square ratio of the amplitude of the N adjustment demodulation signal among the adjustment demodulation signals. In addition, when the servo demodulation position of the head 15 is demodulated, the magnetic disk device 1 compares the estimation position with the plurality of predicted demodulation positions, and calculates the predicted demodulation position closest to the estimation position among the plurality of predicted demodulation positions as the target servo demodulation position of the target short servo SSV. Therefore, the magnetic disk device 1 can improve the accuracy of the servo demodulation position of the head 15 demodulated from the servo data of the servo region SV including the normal servo NSV and the short servo SSV. Therefore, the magnetic disk device 1 can improve the reliability.

The magnetic disk device 1 may have the servo region SV including only the plurality of normal servo NSVs, may calculate the initial phase of the adjustment demodulation signal obtained by demodulating the burst at the timing adjusted for each normal servo NSV, and may correct the initial phase of the adjustment demodulation signal based on the amplitude of the adjustment demodulation signal obtained by demodulating the burst at the timing adjusted for each normal servo NSV.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk comprising two first servo sectors arranged side by side in a circumferential direction and a second servo sector located between the two first servo sectors;
   a head that writes data to the disk and reads data from the disk; and
   a controller that adjusts a second timing at which the second servo sector is demodulated based on a first timing at which the first servo sector is demodulated, and corrects a first initial phase of a first demodulation signal obtained by demodulating the second servo sector at the second timing, based on a first amplitude of the first demodulation signal.

2. The magnetic disk device according to claim 1, wherein the first servo sector comprises a sync field, a servo address mark, a gray code, a first N burst, and a first Q burst, and the second servo sector comprises a second N burst and a second Q burst.

3. The magnetic disk device according to claim 2, wherein the controller adjusts the second timing for demodulating the second N burst based on the first timing at which the servo address mark is demodulated.

4. The magnetic disk device according to claim 2, wherein the controller weights and averages the first initial phase and a second initial phase of the second demodulated signal according to a first ratio obtained by dividing the square of the absolute value of the first amplitude of the first demodulation signal obtained by demodulating the second N burst at the second timing by the sum of the square of the absolute value of the first amplitude and the square of the absolute value of the second amplitude of the second demodulation signal obtained by demodulating the second Q burst.

5. The magnetic disk device according to claim 1, wherein the controller corrects the first initial phase based on the square of the absolute value of the first amplitude.

6. The magnetic disk device according to claim 5, wherein the controller weights and averages the first initial phase based on a table showing a relationship between the square of the absolute value of the first amplitude and the weight of the first demodulated signal, and the square of the absolute value of the first amplitude.

7. The magnetic disk device according to claim 1, wherein the controller compares an estimation position obtained by estimating a first position for demodulating the second servo sector with a plurality of second positions, and calculates a third position closest to the estimation position among the plurality of second positions as the first position.

8. The magnetic disk device according to claim 7, wherein the plurality of second positions comprise a fourth position obtained by combining a first track address calculated based on the first servo sector and a first servo position obtained by demodulating the second servo sector, a fifth position obtained by combining the first track address and a second servo position obtained by demodulating a second data pattern obtained by inverting first data pattern of the second servo sector, a sixth position obtained by combining a second track address of a second track adjacent in a radial direction of a first track of the first track address and the first servo position, a seventh position obtained by combining the second track address and the second servo position, an eighth position obtained by combining a third track address of a third track adjacent on the opposite side to the second track in the radial direction of the first track and the first servo position, and a ninth position obtained by combining the third track address and the second servo position.

9. The magnetic disk device according to claim 2, wherein a first length of the first servo sector in the circumferential direction is longer than a length of the second servo sector in the circumferential direction.

10. A magnetic disk device comprising:
a disk comprising two first servo sectors arranged side by side in a circumferential direction and a second servo sector located between the two first servo sectors;
a head that writes data to the disk and reads data from the disk; and
a controller that corrects a first initial phase of a first demodulation signal obtained by demodulating the first servo sector at a first timing based on a first amplitude of the first demodulation signal, adjusts a second timing for demodulating the second servo sector based on the first timing, and corrects a second initial phase of a second demodulation signal obtained by demodulating the second servo sector at the second timing based on a second amplitude of the second demodulation signal.

11. The magnetic disk device according to claim 10, wherein a first length of the first servo sector in the circumferential direction is longer than a length of the second servo sector in the circumferential direction.

12. A method for demodulating a servo demodulation position, which is applied to a magnetic disk device including a disk having two first servo sectors arranged side by side in a circumferential direction and a second servo sector located between the two first servo sectors, and a head that writes data to the disk and reads data from the disk, the method comprising:
adjusting a second timing at which the second servo sector is demodulated, based on a first timing at which the first servo sector is demodulated; and
correcting a first initial phase of a first demodulation signal obtained by demodulating the second servo sector at the second timing, based on a first amplitude of the first demodulation signal.

13. The method for demodulating a servo demodulation position according to claim 12, wherein the first servo sector comprises a sync field, a servo address mark, a gray code, a first N burst, and a first Q burst, and
the second servo sector comprises a second N burst and a second Q burst.

14. The method for demodulating a servo demodulation position according to claim 13, further comprising:
adjusting the second timing for demodulating the second N burst based on the first timing at which the servo address mark is demodulated.

15. The method for demodulating a servo demodulation position according to claim 13, further comprising:
weighting and averaging the first initial phase and a second initial phase of the second demodulated signal according to a first ratio obtained by dividing the square of the absolute value of the first amplitude of the first demodulation signal obtained by demodulating the second N burst at the second timing by the sum of the square of the absolute value of the first amplitude and the square of the absolute value of the second amplitude of the second demodulation signal obtained by demodulating the second Q burst.

16. The method for demodulating a servo demodulation position according to claim 12, further comprising:
correcting the first initial phase based on the square of the absolute value of the first amplitude.

17. The method for demodulating a servo demodulation position according to claim 16, further comprising:
weighting and averaging the first initial phase based on a table showing a relationship between the square of the absolute value of the first amplitude and the weight of the first demodulated signal, and the square of the absolute value of the first amplitude.

18. The method for demodulating a servo demodulation position according to claim 12, further comprising:
comparing an estimation position obtained by estimating a first position for demodulating the second servo sector with a plurality of second positions, and
calculating a third position closest to the estimation position among the plurality of second positions as the first position.

19. The method for demodulating a servo demodulation position according to claim 18, wherein the plurality of second positions comprise a fourth position obtained by combining a first track address calculated based on the first servo sector and a first servo position obtained by demodulating the second servo sector, a fifth position obtained by combining the first track address and a second servo position obtained by demodulating a second data pattern obtained by inverting first data pattern of the second servo sector, a sixth position obtained by combining a second track address of a second track adjacent in a radial direction of a first track of the first track address and the first servo position, a seventh position obtained by combining the second track address and the second servo position, an eighth position obtained by combining a third track address of a third track adjacent on the opposite side to the second track in the radial direction of the first track and the first servo position, and a ninth position obtained by combining the third track address and the second servo position.

20. The method for demodulating a servo demodulation position according to claim 13, wherein a first length of the first servo sector in the circumferential direction is longer than a length of the second servo sector in the circumferential direction.

* * * * *